(12) United States Patent
Wirola et al.

(10) Patent No.: US 8,929,924 B2
(45) Date of Patent: Jan. 6, 2015

(54) SCREENING TERMINAL POSITIONS AT A TERMINAL

(75) Inventors: Lauri Aarne Johannes Wirola, Tampere (FI); Tommi Antero Laine, Tampere (FI); Matti Samuli Raitoharju, Tampere (FI); Niilo Torsten Sirola, Tampere (FI)

(73) Assignee: Nokia Corporation, Espoo (FI)

( * ) Notice: Subject to any disclaimer, the term of this patent is extended or adjusted under 35 U.S.C. 154(b) by 672 days.

(21) Appl. No.: 13/202,595

(22) PCT Filed: Mar. 4, 2009

(86) PCT No.: PCT/US2009/001411
§ 371 (c)(1),
(2), (4) Date: Aug. 22, 2011

(87) PCT Pub. No.: WO2010/101546
PCT Pub. Date: Sep. 10, 2010

(65) Prior Publication Data
US 2011/0306365 A1    Dec. 15, 2011

(51) Int. Cl.
*H04W 24/00* (2009.01)
*H04B 17/00* (2006.01)
*H04W 16/18* (2009.01)
*H04W 24/10* (2009.01)

(52) U.S. Cl.
CPC ........... *H04B 17/0072* (2013.01); *H04W 16/18* (2013.01); *H04W 24/10* (2013.01)
USPC ..................................... 455/456.6; 455/456.1

(58) Field of Classification Search
CPC ....... H04W 64/00; H04W 4/02; H04W 48/04; H04W 16/18; H04W 24/10; H04L 29/08657; G01S 5/14; G01S 19/14; H04M 1/72577; H04M 1/72572; H04B 17/0072

USPC ............ 455/422.1, 456.1–456.6, 403, 404.1, 455/404

See application file for complete search history.

(56) References Cited

U.S. PATENT DOCUMENTS

| | | | |
|---|---|---|---|
| 5,038,398 A | 8/1991 | Wills | |
| 6,243,648 B1 | 6/2001 | Kilfeather et al. | |
| 2006/0094438 A1* | 5/2006 | Hamilton et al. | 455/452.2 |
| 2006/0183487 A1* | 8/2006 | Allen et al. | 455/456.5 |
| 2006/0189272 A1 | 8/2006 | Willenegger et al. | |
| 2007/0129082 A1* | 6/2007 | Thacher | 455/456.1 |
| 2008/0085692 A1 | 4/2008 | Hart et al. | |
| 2008/0186882 A1 | 8/2008 | Scherzer et al. | |
| 2009/0286549 A1* | 11/2009 | Canon et al. | 455/456.1 |
| 2010/0178934 A1* | 7/2010 | Moeglein et al. | 455/456.1 |
| 2013/0150081 A1* | 6/2013 | Bells et al. | 455/456.1 |

OTHER PUBLICATIONS

Notification of Transmittal of International Search Report and Written Opinion (2 pages), International Search Report dated May 4, 2009 in International Patent Application No. PCT/US2009/01411 (3 pages) and Written Opinion (4 pages).

(Continued)

*Primary Examiner* — Ajit Patel
(74) *Attorney, Agent, or Firm* — Locke Lord LLP

(57) ABSTRACT

It is disclosed an apparatus, a method and a computer program for determining, at a terminal, whether at least one terminal position associated with a coverage area of a communication node shall be discarded or reported to allow at least one of said coverage area and said communication node to be characterized at least partially based on said at least one reported terminal position.

30 Claims, 13 Drawing Sheets

(56) References Cited

OTHER PUBLICATIONS

Notification of Transmittal of International Preliminary Report on Patentability (1 page), International Preliminary Report on Patentablility dated Jan. 31, 2011 in International Patent Application No. PCT/US2009/01411 (11 pages).

U.S. Appl. No. 13/202,603, filed Aug. 22, 2011, Lauri Wirola.
U.S. Appl. No. 13/202,591, filed Aug. 22, 2011, Lauri Wirola.
U.S. Appl. No. 13/202,609, filed Aug. 22, 2011, Lauri Wirola.
U.S. Appl. No. 13/254,271, filed Sep. 1, 2011, Lauri Wirola.

* cited by examiner

SCREENING TERMINAL POSITIONS AT A TERMINAL

THE NAMES OF THE PARTIES TO A JOINT RESEARCH AGREEMENT

The claimed invention was made by or on behalf of Tampere University of Tampere, Finland and Nokia Corporation of Espoo, Finland as parties to a joint research agreement that was in effect on or before the date the claimed invention was made.

FIELD

This invention relates to communication nodes and coverage areas of communication nodes and to the process of their characterization.

BACKGROUND

As an alternative or add-on to satellite-based positioning systems, positioning systems in which a present position of a terminal is estimated based on a list of communication nodes (such as for instance cellular base stations, access points or beacons) that can presently be heard by the terminal and a database that contains identifiers and positions of the communication nodes and/or models for the coverage areas for a number of communication nodes have gained recent interest.

Given that the communication node positions are known and distances from the terminal to the communication nodes can be estimated, the terminal's position can be estimated through triangulation. Distance between a terminal and the heard communication nodes can be estimated for instance based on either the path loss using a channel model (i.e. how much the signal attenuates between the terminal and the communication node) or based on timing (or round-trip timing) measurements (i.e. information expressing how long signals propagate between terminal and communication node).

Alternatively, if models for the communication node coverage areas are known, then a terminal may pick the coverage areas for the heard communication nodes and find the intersection of these coverage areas. The terminal can then be assigned a position that is, for instance, the center-of-mass of the intersection area. Similarly an error estimate for the position estimate can be given, for example, based on the size of the intersection.

A model for the coverage area of a communication node can for instance be determined by having one or more terminals that are capable of determining their position send reports with their present position and a list of one or more communication nodes that can presently be heard to a server, gathering, for each communication node, the terminal positions reported into a set of terminal positions and deriving, from this set of terminal positions, a model for the coverage area of the communication node.

Furthermore, if the reports further contain information on a distance between terminal and communication node, it is also possible to estimate a position of the communication node based on the set of terminal positions and the associated distances.

SUMMARY OF SOME EXEMPLARY EMBODIMENTS OF THE INVENTION

With increasing numbers of reporting terminals and increasing frequency of reporting, a huge amount of reports may have to be processed when determining one or more models for the coverage area of a communication node and/or estimating a position of a communication node.

According to a first aspect of the present invention, an apparatus is disclosed, comprising a processor configured to determine, at a terminal, whether at least one terminal position associated with a coverage area of a communication node shall be discarded or reported to allow the coverage area and/or the communication node to be characterized at least partially based on the at least one reported terminal position.

The processor may for instance be implemented in hardware alone, may have certain aspects in software alone, or may be a combination of hardware and software. An exemplary embodiment of the processor may comprise a memory, wherein instructions executed by the processor may be transferable to the memory and/or contained in the memory. The memory may for instance store a program according to the fourth aspect of the present invention described below, or at least parts thereof.

According to a second aspect of the present invention, further an apparatus is disclosed, comprising means for determining, at a terminal, whether at least one terminal position associated with a coverage area of a communication node shall be discarded or reported to allow the coverage area and/or the communication node to be characterized at least partially based on the at least one reported terminal position.

Therein, the means for determining may for instance be embodied as a processor, but the means are not limited thereto.

The apparatuses according to the first and second aspect of the present invention may for instance be embodied as a module. They may for instance comprise a user interface and/or an antenna. They may for instance be embodied as a portable electronic communication device.

According to a third aspect of the present invention, furthermore a method is disclosed, comprising determining, at a terminal, whether at least one terminal position associated with a coverage area of a communication node shall be discarded or reported to allow the coverage area and/or the communication node to be characterized at least partially based on the at least one reported terminal position.

According to a fourth aspect of the present invention, further a program is disclosed, comprising program code for performing the method according to the first aspect of the present invention and all exemplary embodiments thereof, when the program is executed on a processor.

The program may for instance be distributed via a network, such as for instance the Internet. The program may for instance be stored or encoded on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device. The readable medium may for instance be a tangible medium, for instance a tangible storage medium.

The communication node may for instance be a communication node of a communication system. It may then for instance provide coverage for one or more terminals. The communication system may be a wireless or a wire-bound communication system, and may be of cellular or non-cellular type. The communication node may for instance be a one-directional or bi-directional communication node. Non-limiting examples of the communication node are thus a cellular base station, a Wireless Local Area Network (WLAN) access point, an FM radio station, a TV station. The communication node may be fixed or mobile, for instance with low mobility and/or velocity. In case of sectorization of cells, each sector may also be understood as a communication node, even if all sectors are controlled by the same (cellular) base station.

The terminal may for instance be fixed or mobile, and may be embodied in various types of devices allowing for communication with one or more communication nodes (of one or more different communication systems such as cellular communication systems and WLAN communication systems), such as for instance a mobile phone, a personal digital assistant, a (laptop) computer or netbook, to name but a few non-limiting examples.

The communication node has a coverage area, which may be understood as an area within which one or more terminals are able to receive signals sent from the communication node at least with a pre-determined minimum quality (for instance with a quality that allows a terminal to receive and decode signals sent by the communication node, such as for instance a broadcast channel, or with a quality that allows a terminal to be able to decode an identification of the communication node (e.g. a MAC address or any other type of communication node identification)), wherein the quality may for instance be expressed in terms of signal strength or signal-to-noise-ratio, to name but a few examples. In case of a wireless communication node, the coverage area may for instance depend on the transmission frequency and the propagation environment, which may for instance cause shadowing. The coverage area does not necessarily have to be continuous, it may equally well have recesses and may equally well consist of several sub-areas.

The at least one terminal position is a position of the terminal. This position is for instance measured by the terminal itself, for instance based on a satellite- and/or beacon-based navigation system, or is measured or determined by an entity (such as human being or an apparatus) that is different from the terminal and then provided to the terminal. The terminal positions may for instance be measured by the terminal regularly, for instance according to a schedule (e.g. in pre-defined equidistant intervals). The terminal positions may also be determined by a human being (regularly or irregularly) based on a map and/or on characteristic landmarks and entered into the terminal. The terminal position may be a present position of the terminal, but equally well may be a position of the terminal at a previous time instant (for instance with respect to the time instant of reporting). For instance, the terminal may measure/obtain several terminal positions at different time instants that are to be reported in a joint report (a so-called batch report).

The terminal position is associated with the coverage area. Therein, a terminal position may be associated with coverage areas of several communication nodes at the same time. The feature that the terminal position is associated with the coverage area may for instance be understood to require that the terminal is (or is at least believed to be) within the coverage area of the communication node at a time instant when the terminal position is determined. The terminal may for instance be considered to be within the coverage area of the communication node if it is able to hear the communication node. Therein, a terminal may for instance be considered to "hear" a communication node if it is able to receive one or more signals, which are sent by the communication node, with a pre-defined minimum quality, wherein the quality may for instance be defined in terms of a signal-to-noise ratio or a signal-to-noise and interference ratio. An example of such a signal sent by a communication node may for instance be a broadcast channel. As an alternative, the terminal may for instance be considered to "hear" a communication node if the terminal is capable of at least partially receiving and correctly decoding one or more signals sent by the communication node, such as a broadcast channel. For instance, the terminal may considered to "hear" the communication node if it is at least able to decode an identification of the communication node (e.g. a MAC address or any other type of communication node identification). The information which communication nodes a terminal can hear may for instance result from a scanning/sniffing operation performed by the terminal.

Terminal positions can be reported, for instance by including the terminal position into a report (e.g. a so-called fingerprint) and transmitting the report to a unit that is different from the terminal, for instance to a server. Therein, the server may be a component of the communication system that comprises the communication node, but may equally well not be a part of the communication system that comprises the communication node. For instance, the terminal positions may be reported in messages exchanged between the terminal and the communication node (or another communication node of the same communication system), and may then be forwarded by the receiving communication node to a server that collects such reports. Equally well, the report may be sent from the terminal to a receiving unit that is not part of the communication system that comprises the communication node (for instance to a communication node of another communication system). The terminal position may be reported together with an identification of the communication node, for instance if this identification can not be derived otherwise. For instance, if the terminal reports the terminal position to (or via) the communication node (i.e. the communication node it is associated with), it may not be necessary to include the identification of the communication node. Otherwise, if the terminal reports the terminal position to a different communication node of either the same communication system (e.g. in case of a batch report) or a different communication system, it may be necessary to also report an identification of the communication node together with the terminal position. The terminal position may be reported together with further parameters, such as for instance range measurements indicating a distance to the communication node and/or timestamps.

At least partially based on the at least one reported terminal position (i.e. potentially also under consideration of further reported terminal positions and/or further parameters), the coverage area and/or the communication node can be characterized. For instance, the at least one reported terminal position may allow generating/updating one or more models for the coverage area of the communication node (for instance based on geometrical shapes that may for instance enclose all terminal positions reported for the coverage area). Equally well, the at least one reported terminal position may allow estimating a position of the communication node. This may for instance require further parameters to be reported together with the terminal position, such as for instance information on a distance between the terminal and the communication node.

At the terminal, it is determined whether at least one terminal position shall be discarded or reported to allow the coverage area and/or the communication node to be characterized at least partially based on the at least one reported terminal position. This determining may be based on information provided to the terminal, or on information produced by the terminal itself. Therein, the at least one terminal position may for instance be understood to be discarded since it is considered to be insignificant for the characterizing of the coverage area and/or the communication node and/or because further information for the characterizing of the coverage area and/or the communication node is (currently) not required.

Thus instead of reporting every terminal position that is determined or obtained at the terminal, i.e. is already present and available at the terminal for reporting, the terminal can determine if one or more terminal positions shall be discarded instead. In exemplary embodiments of the present invention, this may contribute to reduce an amount of information that has to be processed when characterizing the coverage area and/or the communication node, for instance by a unit that is configured to characterize the coverage area of the communication node (for instance by generating and/or updating one or more models for the coverage area of the communication node) and/or the communication node (for instance by estimating a position of the communication node). Furthermore, the amount of transmission resources (e.g. bandwidth, power) required for reporting the terminal positions to this unit may also be reduced, accordingly. The determining whether the at least one position shall be discarded or reported may be considered as a screening or filtering of terminal positions in the terminal.

According to exemplary embodiments of all aspects of the present invention, the determining whether the at least one terminal position shall be discarded or reported is at least partially based on at least one of a model for the coverage area of the communication node and a modified model for the coverage area of the communication node that is obtained by modifying the at least one model for the coverage area of the communication node. It may for instance be determined whether the at least one terminal position shall be discarded or reported depending on whether the at least one terminal position is covered by the model for the coverage area of the communication node and/or the modified model or not. The model for the coverage area of the communication node may for instance approximate the (assumed) coverage as a geometrical object (such as for instance an ellipse (including a circle as a special case) and a polygon (including a triangle and a rectangle as special cases)). Therein, the geometrical object may for instance be considered as a hard boundary, so that a terminal position has to be within the geometrical object to be considered to be covered by the model for the coverage area. Equally well, the geometrical object may be a soft statistical boundary that is for instance based on a statistical model for the distribution of the terminal positions in the coverage area and is characterized by further parameters such as for instance a confidence value. A terminal position may then for instance be considered to be covered by the model for the coverage area even if it is not within the geometrical object (an example of such a geometrical object is for instance the 1$\sigma$-, 2$\sigma$- or 3$\sigma$-area of an assumed 2D Gaussian distribution of terminal positions in a coverage area). The modifying of the model for the coverage area may for instance comprise changing a format of the model and/or changing an area described by the model, to name but a few examples. The model and/or the modified model may for instance be provided to the terminal by a unit that is different from the terminal, such as a server.

The model for the coverage area of the communication node may for instance be derived, as a characterization of the coverage area, from one or more terminal positions associated with the coverage area of the communication node and reported by one or more terminals. The model for the coverage area of the communication node may for instance be a geometrical object that encloses all of the one or more terminal positions, or may be derived from such a geometrical object. The deriving may for instance be performed at a server that receives the one or more reported terminal positions.

The at least one terminal position may for instance be determined to be discarded if it is covered by at least one of the model for the coverage area of the communication node and the modified model. It may for instance be considered that a terminal position that is already covered by the model and/or the modified model does not contribute to the characterization of the coverage area and/or the communication node and thus should not be reported. In contrast, terminal positions that are not already covered by the model and/or the modified model may be considered to be significant for the characterization of the coverage area and/or the communication node and thus may be reported.

The modified model for the coverage area of the communication node may for instance be a scaled representation of the at least one model for the coverage area of the communication node. The scaling may for instance cause the modified model to have a smaller area than the original model. This may allow reducing the amount of (insignificant) terminal positions reported to a process that characterizes the coverage area and/or the communication node based on the reported terminal positions, while still reporting (significant) terminal positions near the assumed boundary of the coverage area. This may for instance be advantageous if at least one portion of the boundary (e.g. a boundary point) of the assumed coverage area is monitored to determine if it is at least partially outdated and/or if it represents on outlier with respect to the coverage area by setting up a monitoring area around the at least one portion of the boundary and by checking if terminal positions within this monitoring area are reported (which would indicate that the boundary portion is not outdated and does not represent an outlier) or not (indicating that the boundary portion is outdated or an outlier).

In an exemplary embodiment of the apparatus according to the first aspect of the present invention, the processor is further configured to determine a mismatch between the at least one terminal position and at least one of the model for the coverage area of the communication node and the modified model and to report an indication of such a mismatch. The apparatus according to the second aspect of the present invention comprises according means for determining such a mismatch and means for reporting an indication of such a mismatch, and the method according to the third aspect of the present invention comprises determining such a mismatch and reporting an indication of such a mismatch. The mismatch may for instance be determined if a distance between the terminal position and the model and/or the modified model exceeds a pre-defined threshold. The threshold may for instance depend on an assumed maximum extension (e.g. an assumed maximum radius) of a coverage area. The mismatch may for instance be interpreted to indicate that the terminal position is a potential outlier.

Therein, an outlier may for instance be defined as a terminal position that is too far apart from the coverage area of the communication node, for instance since it has a distance with respect to the coverage area that is above a distance threshold. A position may be classified as a potential outlier if it is considered to be too far apart from the assumed coverage area of the communication node, for instance since it has a distance with respect to the assumed coverage area that is above a distance threshold, wherein the assumed coverage area of the communication node may for instance be represented by a model for said coverage area. Such a potential outlier may for instance indicate that the coverage area of the communication node has changed, for instance moved. The indication may for instance be a flag (e.g. a one-bit word), and this indication may be reported together with the terminal position to indicate to a process that characterizes the coverage area and/or the communication node (e.g. generates/updates one or more models for the coverage area of the communication node) that the reported terminal position is a potential outlier and/or that the coverage area might have changed.

According to an exemplary embodiment of all aspects of the present invention, the determining whether the at least one terminal position shall be discarded or reported is at least partially based on information on terminal positions that have been reported by the terminal before. The terminal may for instance keep a history of already reported terminal positions, and it may be decided based on this history whether a terminal position shall be discarded or reported. This history may also store, for instance based on an identifier, such as an identifier of the communication node, for which coverage area a terminal position has already been reported, for instance to account for cases where a terminal position has already been reported, but with respect to a coverage area with another identifier, or for cases where an identifier of the coverage area has changed. In both of these cases, reporting of the terminal position may be desired.

Filtering terminal positions based on information on terminal positions that have been reported (for instance for a coverage area with the same identifier) by the terminal before may contribute to reducing the amount of insignificant terminal positions reported to a process that characterizes the coverage area and/or the communication node, since, for instance in the case that a coverage area does not change, already reported terminal positions may have already been considered and thus add no new information to the process.

The at least one terminal position may for instance be discarded if it is in a respective defined environment of any terminal position of a defined set of terminal positions that have been reported for a coverage area with the same identifier (e.g. the same coverage area) before. The at least one terminal position may for instance be discarded if it equals an already reported terminal position, or if it is within a defined environment of one or more already reported positions (for instance with respect to a coverage area with the same identifier). The defined environment may for instance be a pre-defined environment, such as for instance a pre-defined area such as a rectangle or a circle around an already reported terminal position. The defined set of terminal positions that have been reported before may for instance comprise all terminal positions reported so far (e.g. for a coverage area with the same identifier), or only a part thereof, for instance only those terminal positions that have been reported (e.g. for a coverage area with the same identifier) within a pre-defined period of time (for instance on the same day or in the last hour, to name but a few examples).

According to an exemplary embodiment of all aspects of the present invention, it is determined whether the at least one terminal position and information on a distance between the at least one terminal position and the communication node shall be discarded or reported, and wherein the determining is at least partially based on information on a quality of an estimate of a position of the communication node. The information on the distance may for instance be a Timing Advance (TA) value that is used for each terminal to ensure synchronism of transmission, or a Round-Trip-Delay (RTD) or Received Signal Strength (RSS) value, to name but a few non-limiting examples. The quality of the estimate of the position of the communication node may for instance be provided to the terminal (for instance from a unit that produced the estimate), for instance together with the estimate itself. The quality may for instance be indicated by a flag (such as a one-bit word) that indicates a good or bad quality, or by a covariance matrix (or a part or characteristic value thereof) associated with the estimate, to name but a few examples. A low quality may for instance indicate that further information should be reported to improve the characterization of the communication node (for instance in terms of its position).

The position of the communication node may for instance be estimated, as a characterization of the communication node, based on one or more terminal positions and respective information on the distance between the terminal positions and the communication node reported by one or more terminals. The position of the communication node may for instance be estimated by a unit (e.g. a server) that is different from the terminal and that receives reports containing terminal positions and respective distances between the terminal position and the communication node from one or more terminals. The unit may then also determine a quality of the estimate, and may also provide the estimate to the terminal. The unit may furthermore determine one or more models for the coverage area of the communication node based on the terminal positions reported by the one or more terminals.

The at least one terminal position and the information on the distance between the at least one terminal position and the communication node may for instance be determined to be reported if the quality of the estimate of the position of the communication node is considered low according to a defined criterion. The criterion may for instance be a pre-defined criterion or a criterion that is controlled dynamically. In exemplary embodiments of the present invention, reporting the at least one terminal position and the information on the distance may be advantageous in case the quality of the communication node position estimate is low, since then more information for the estimation of the communication node position is available to a process that implements this estimation. On the other hand, if the quality is high, an amount of information provided to the process and/or an amount of transmission resources (e.g. bandwidth, power) required may be significantly reduced by discarding terminal positions (and the respective information on the distance).

According to an exemplary embodiment of all aspects of the present invention, the determining whether the at least one terminal position shall be discarded or reported is at least partially based on a state of a process for characterizing the coverage area of the communication node at least partially based on one or more terminal positions reported by one or more terminals. The process for characterizing the coverage area of the communication node may for instance be a process for generating and/or updating one or more models for the coverage area of the communication node. The state of the process may for instance represent a maturity or progress of the characterizing, for instance a maturity of at least one model produced by the process for generating and/or updating the one or more models for the coverage area of the communication node. For instance, there may exist a state where the terminal shall report any terminal position, and/or a state where the terminal shall only report terminal positions that are not already covered by one of a model for the coverage area of the communication node and a modified model for the coverage area of the communication node. The state may for instance be provided to the terminal by a unit that is different from the terminal and that implements the process of characterizing. As already indicated above, the determining whether the at least one terminal position shall be discarded or reported may thus be partially based on both on such a state and on one of a model for the coverage area of the communication node and a modified model for the coverage area of the communication node, wherein this modified model may for instance be obtained from the (original) model by modifying, for instance by scaling (such as area reduction). Similarly, the determining whether the at least one terminal position shall be discarded or reported may also be based on a state of a process for characterizing the communication node (for instance its position) at least partially based on one or more terminal positions reported by one or more terminals.

According to an exemplary embodiment of the first aspect of the present invention, the apparatus further comprises a transmitter for reporting the at least one terminal position in case it is determined that the at least one terminal position shall be reported. Accordingly, the apparatus according to the second aspect of the present invention comprises means for reporting the at least one terminal position in case it is determined that the at least one terminal position shall be reported, and the method according to the third aspect of the present invention comprises reporting the at least one terminal position in case it is determined that the at least one terminal position shall be reported.

According to an exemplary embodiment of all aspects of the present invention, in case it is determined that the at least one terminal position shall be reported, the at least one terminal position is reported as a fingerprint that further comprises an identifier of the communication node. The identifier of the communication node may however be not included in the fingerprint if it can be otherwise determined, for instance since the terminal is currently associated (e.g. registered) with the communication node.

The fingerprint may further comprise an identifier of another communication node for which it is determined that the terminal position shall be reported to allow at least one of a coverage area of the other communication node and the other communication node to be characterized at least partially based on the at least one reported terminal position. The fingerprint may furthermore contain distances from the terminal position to the one or more communication nodes (if available), and/or a timestamp, and/or further parameters.

The fingerprint may be reported solely, or in combination with further fingerprints (for instance as a batch of fingerprints measured at different time instants).

It is to be noted that the above description of embodiments of the present invention is to be understood to be merely exemplary and non-limiting. Furthermore, the exemplary embodiments described above and in particular their single features shall be understood to be disclosed in all possible combinations with each other.

These and further concepts of the invention will be apparent from and elucidated with reference to the detailed description presented hereinafter.

DETAILED DESCRIPTION OF EXEMPLARY EMBODIMENTS OF THE INVENTION

Figure 1:
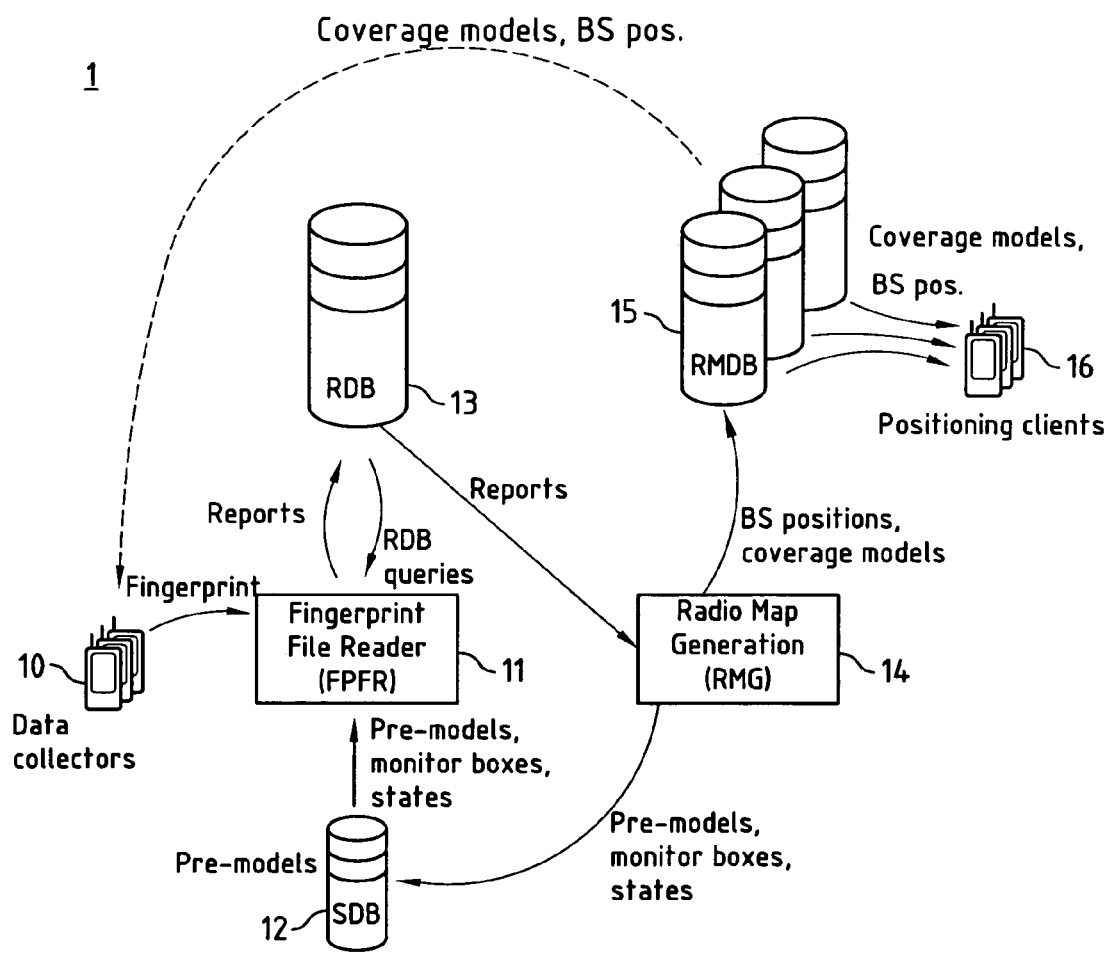
FIG. 1: A schematic block diagram of an exemplary system that implements exemplary concepts of the present invention.

Satellite positioning does not work well indoors or in other shadowed environments. However, various communication nodes are ubiquitous in the modern world. Non-limiting examples of such communication nodes include cellular base stations, WLAN access points, FM radio or TV stations. Instead of the term "communication node", also the term "base station" will be used in the following description, wherein the term "base station" is not necessarily understood to be restricted to a cellular base station. These base stations have good penetration and coverage virtually everywhere of interest. Since the range of these beacons may usually be relatively short (for instance hundreds of meters to some kilometers), these beacons may be exploited for positioning purposes.

For instance, WLAN-based positioning may complement Global Navigation Satellite System (GNSS) based positioning in urban environments. Typically GNSS-based positioning methods have problems in urban canyons—however, these are also areas, in which the WLAN AP density is high. WLAN-positioning also enables indoor positioning allowing for more effective Location Based Services (LBS).

WLAN Access Points (WLAN APs) can be used for positioning given that the position (s) of the AP (s) are known. In general, WLAN-based positioning assumes a database, either local (in the terminal) or remote (in the server) or a combination of those containing at least WLAN AP identification information (e.g. a WLAN AP Medium Access Control (MAC) address) and the geographical coordinates of the WLAN APs. The database may also contain an estimate of the WLAN AP position accuracy. Moreover, a coverage area of the WLAN AP may also be modeled.

The database of WLAN APs and their geographical coordinates and/or coverage models allow for positioning the terminal with WLAN. GNSS or some other conventional positioning capability may then not be required.

In positioning, the terminal performs a WLAN AP scan and then compares the scan results to the records in the database. If applicable records are found, the information is combined in some suitable manner (such as, weighted average based on Relative Signal Strength (RSS) values) to produce a position estimate for the terminal.

Therein, if the base station positions are known and distances from the terminal to the base stations can be estimated, the terminal's position can be estimated through triangulation. The distance between a terminal and the heard base stations can for instance be estimated based on either the path loss (i.e. how much the signal attenuates between the terminal and the base station) using a channel model or based on timing (or round-trip timing) measurements (i.e. information expressing how long signals propagate between terminal and base station).

If models for the coverage areas of base stations are known, then a terminal may pick the coverage areas for the heard base stations and find the intersection of these coverage areas. The terminal can then be assigned a position that is, for instance, the center-of-mass of the intersection area.

Moreover, a position error estimate may be given based on the size of the intersection.

These mechanisms may also be combined: distance measurements can be combined with coverage area models to produce a position estimate. Even satellite (GNSS) pseudorange measurements may be taken into account in these hybrid methods to obtain additional measurements.

The database for WLAN-based positioning can be built in various ways. One solution may be that a company buys hotspot directories from WLAN network providers and assimilates these directories in their databases. Alternatively, a plurality of terminals may perform the WLAN AP mapping. In such a case the terminals may have a Global Navigation Satellite System (GNSS) or Assisted GNSS (AGNSS) receiver attached to or inside the terminal and provide data on the WLAN APs' coverage. It may also be the case that the database build-up is a community-based effort.

It is readily understood by a person skilled in the art that the techniques described above in the context of a WLAN system are equally applicable with any other radio network-technology as well. Potential candidates include Bluetooth, Wibree (Ultra Low Power Bluetooth), Global System for Mobile Communication (GSM), Wideband Code Division Multiple Access (WCDMA), Code Division Multiple Access (CDMA), Long Term Evolution (LTE), Worldwide Interoperability for Microwave Access (WiMAX), to name but a few non-limiting examples.

The above-described WLAN-based positioning may also be combined/complemented with Cell ID-based positioning. When collecting the data for the WLAN AP database, then also information on 2G (second generation, e.g. GSM) and/or 3G (third generation, e.g. UMTS) cells (or on cells of any cellular communication system) that can be observed in the present position (serving cell and optionally also the neighboring stations) may be collected.

The data collected on WLAN APs and 2G/3G cells can for instance be collected on central servers and distributed to the terminals for position determination.

FIG. 1 schematically illustrates the functional blocks of an exemplary system 1 that implements concepts of the present invention.

The server side of the exemplary system 1 comprises two processing blocks, Finger Print (FP) File Reader (FPFR) block 11 and Radio Map Generation (RMG) block 14. Moreover, there are three data stores, Report Data Base (RDB) 13, Screening Data Base (SDB) 12 and Radio Map Data Base (RMDB) 15. Each can be either centralized or, for example, regionally distributed. Moreover, although the exemplary architecture shows several different databases, they can be implemented as one single same database or may be broken down in more databases in different implementations. It is clear to a person skilled in the art that the actual number and naming of databases is an implementation issue and does not affect the concept disclosed in this specification. The terminals 10 acting as data collectors or positioning clients 16 can also be seen as processing blocks of system 1.

The one or more terminals (e.g. mobile terminals of cellular or WLAN communications systems) 10 with positioning capacity (e.g. a GNSS such as GPS) send a fingerprint, which may for instance comprise a terminal position and usually also an identification of the base station(s) heard, if the identification of the base station(s) cannot be determined/reconstructed by a receiving end otherwise. Optionally, the fingerprint may comprise further parameters, as will be explained in further detail below.

The fingerprint arrives to the FPFR block 11, which splits the information into base-station-specific reports, and stores the base-station-specific reports into the RDB 13. Therein, it is to be noted that the base station does not necessarily have to be the primary record for storing fingerprints/reports. Equally well, the fingerprints may be stored in a database in a terminal-position-specific way, so that the according entries in the database then may pertain to several base stations. The fingerprints may of course also be stored and/or processed according to other criteria.

FPFR block 11 may further implement a filter that drops (discards) reports, for instance when they are considered to add no new information to the already collected data. In particular, to be able to deal with the massive number of incoming reports, the FPFR block 11 may for instance make use of simplified pre-models of the coverage area (stored in SDB 12) to be able to quickly drop a large number of redundant reports. Use of these pre-models may depend on the states of a state machine set up for the coverage area.

The RMG block 14 reads (for instance continuously or periodically, or in response to a trigger event, such as an arrival of a new report or an accumulation of a certain amount of reports) reports from the RDB 13, and generates/updates different types of models for the coverage area of the base station. The RMG block 14 may also remove redundant reports from RDB 13, keeping only a small but representative set of reports on the coverage area of each base station. RDB 13 may for instance store a pre-defined number of reports with respect to each base station, and it may be targeted to use as little computation as possible to sieve the significant ones from the mass of incoming reports.

In the exemplary system of FIG. 1, RMG block 14 may exemplarily use a polygon (for instance a polygon such as a convex hull) to represent the terminal positions that are reported by the one or more terminals 10, pass the FPFR block 11 and are at least temporarily stored (in the form of reports) in RDB 13. That is, instead of storing all terminal positions received from FPFR block 11 in RDB 13, only the terminal positions that form the vertices of a polygon (e.g. a convex hull) that encloses all these terminal positions are stored.

Figure 2:
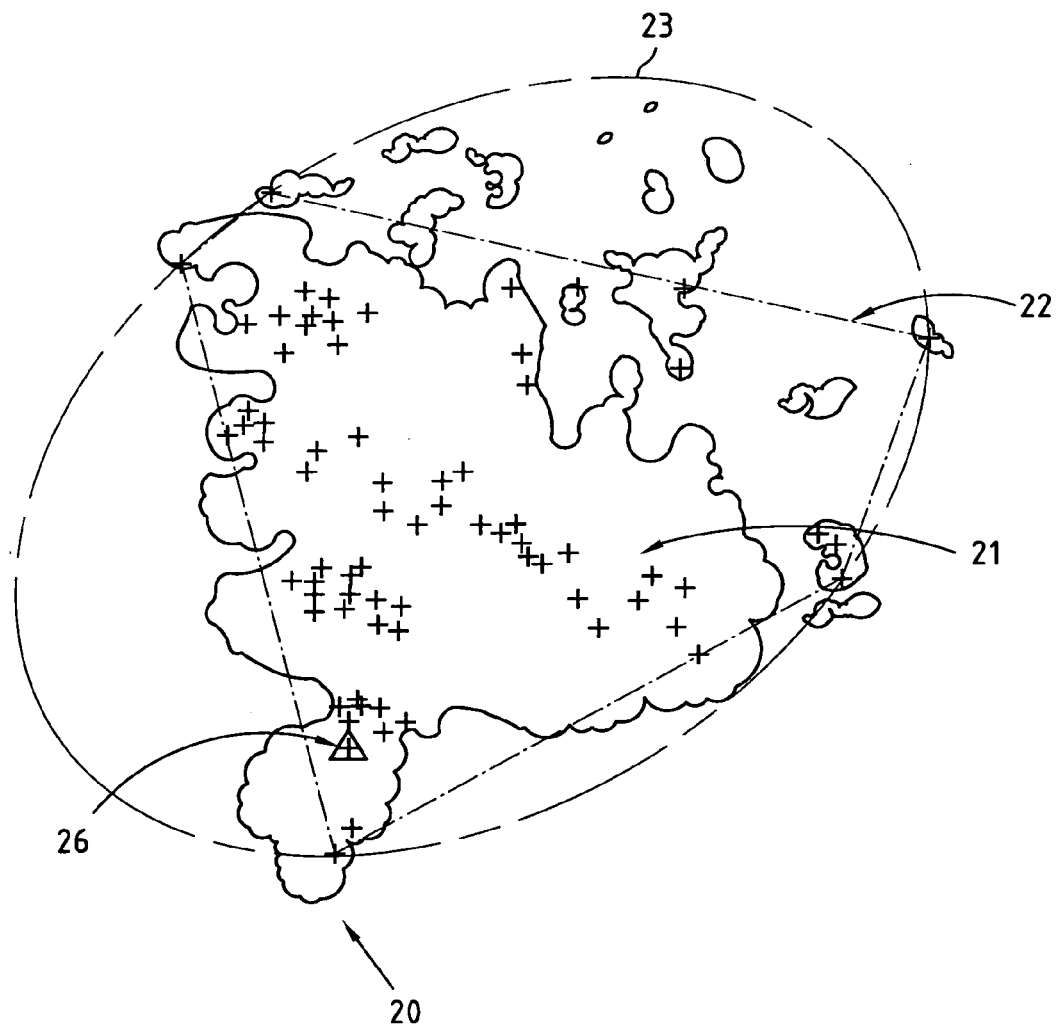
FIG. 2: a schematic illustration of an exemplary coverage area of a base station with exemplary models for this coverage area.

An example of a polygon 22 (in this case a convex hull) enclosing the terminal positions 21 in a coverage area 20 of a base station 26 is given in FIG. 2.

In addition to the polygon 22, the RMG block 14 further generates/updates a coverage model and different pre-models based on this polygon 22.

All of these models (including the polygon) are models for the coverage area of the base station. In the following, models for the coverage area of the base station that are to be provided to the positioning terminals 16 (and optionally also the data collectors 10, see FIG. 1) will be denoted as "coverage models", whereas the models for the coverage area of the base station that are provided to FPFR 11 and stored in SDB 12 will be denoted as "pre-models". All of these models may represent both "hard" and "soft" (e.g. statistical) boundaries for the coverage area, as further explained below.

In the exemplary system of FIG. 1, an elliptical coverage model is generated by RMG block 14 by fitting the minimum enclosing ellipse around the polygon 22 (see for instance ellipse 23 enclosing convex hull 22 in FIG. 2). When updating this ellipse, the old ellipse may be used as the initial guess.

The following two ellipse formats are exemplarily used in this specification, wherein the term "ellipse" is understood to also comprise a circle as a special case of an ellipse with equal major and minor semi-axes:

An "axis/angle-form" ellipse, defined by coordinates of the centre (in World Geodetic System WGS-84) longitude and latitude, lengths of the semi-major and semi-minor axes (in meters, referring to WGS-84 coordinates), and orientation of the semi-major axis (degrees, clock-wise from North). Moreover, a confidence value can be included as well. If the ellipse is interpreted in a statistical sense, i.e. to represent a soft statistical boundary for the positions in the coverage area rather than a hard boundary that includes all positions in the coverage area, the confidence value may specify which area with respect to the coverage area the ellipse describes. For instance, if the positions are assumed to be statistically distributed in the coverage area according to a 2D Gaussian distribution, the confidence value may for instance express if the ellipse represents the $\sigma$, $2\sigma$ or $3\sigma$ area of the 2D Gaussian distribution, wherein $\sigma$ is the standard deviation. Therein, the $\sigma$, $2\sigma$ and $3\sigma$ areas may for instance be understood as the areas in which 39%, 86% and 99% of the terminal positions are considered to be within, respectively.

A "matrix-form" ellipse: coordinates (WGS-84) of the centre $c = (lat_E, lon_E)$, and three coefficients $a>0$, $d>0$, and $b$ so that point $x=(lat, lon)$ is inside the ellipse if $$(x-c)^T A (x-c) \leq 1$$

with $$A = \begin{bmatrix} a & b \\ b & d \end{bmatrix}.$$

The matrix-form ellipse may require more memory space for storage, but may be faster to manipulate than the axis/angle-form ellipse. Similar to the axis/angle-form ellipse, also the matrix-form ellipse may represent a soft statistical boundary for the positions in the coverage area rather than a hard boundary that includes all positions in the coverage area. For instance, the centre c may then be interpreted as the mean value and the matrix A may then be interpreted as the covariance matrix, for instance of a 2D Gaussian distribution assumed for the distribution of the positions in the coverage area. The ellipse may then no longer coincide with the outer boundary of the coverage area, it may rather define a sub-area of the coverage area, for instance the $\sigma$ area.

Details on conversion between the two axis/angle-form ellipse and the matrix-form ellipse are given in Appendix A.1.

In the following, for the sake of simplicity of presentation, it is exemplarily assumed that all models for the coverage area of a base station represent "hard" boundaries of the coverage area.

In the exemplary system of FIG. 1, an elliptical model in axis/angle form or a model derived from it (for instance by adding further parameters) serves as coverage model and is saved in RMDB 15, for instance in the format shown in Table 1. The coverage models (for one or more base stations) stored in RMDB 15 are then delivered to terminals 16 to be used for positioning on their own or combined to other positioning data in the terminals 16, and optionally to data collectors 10, as will be described in further detail below. RMDB 15 may also store further information that may be used by the positioning clients 16 and/or the data collectors 10, as will also be discussed in further detail below.

TABLE 1

Exemplary coverage model entry in the RMDB

| Parameter | Description |
| --- | --- |
| ID | Unique ID code of the base station |
| Type | 2G, 3G, WLAN, etc. |
| State | State of the state machine |
| Position | Base station position estimate and/or quality of this estimate (if available) |
| Coverage model | Coverage model, e.g. a model comprising the parameters of the axis/angle-form ellipse and optionally further parameters |

Furthermore, an elliptical model in matrix-form may for instance serve as a pre-model for the filtering in FPFR block 11.

Figure 3:
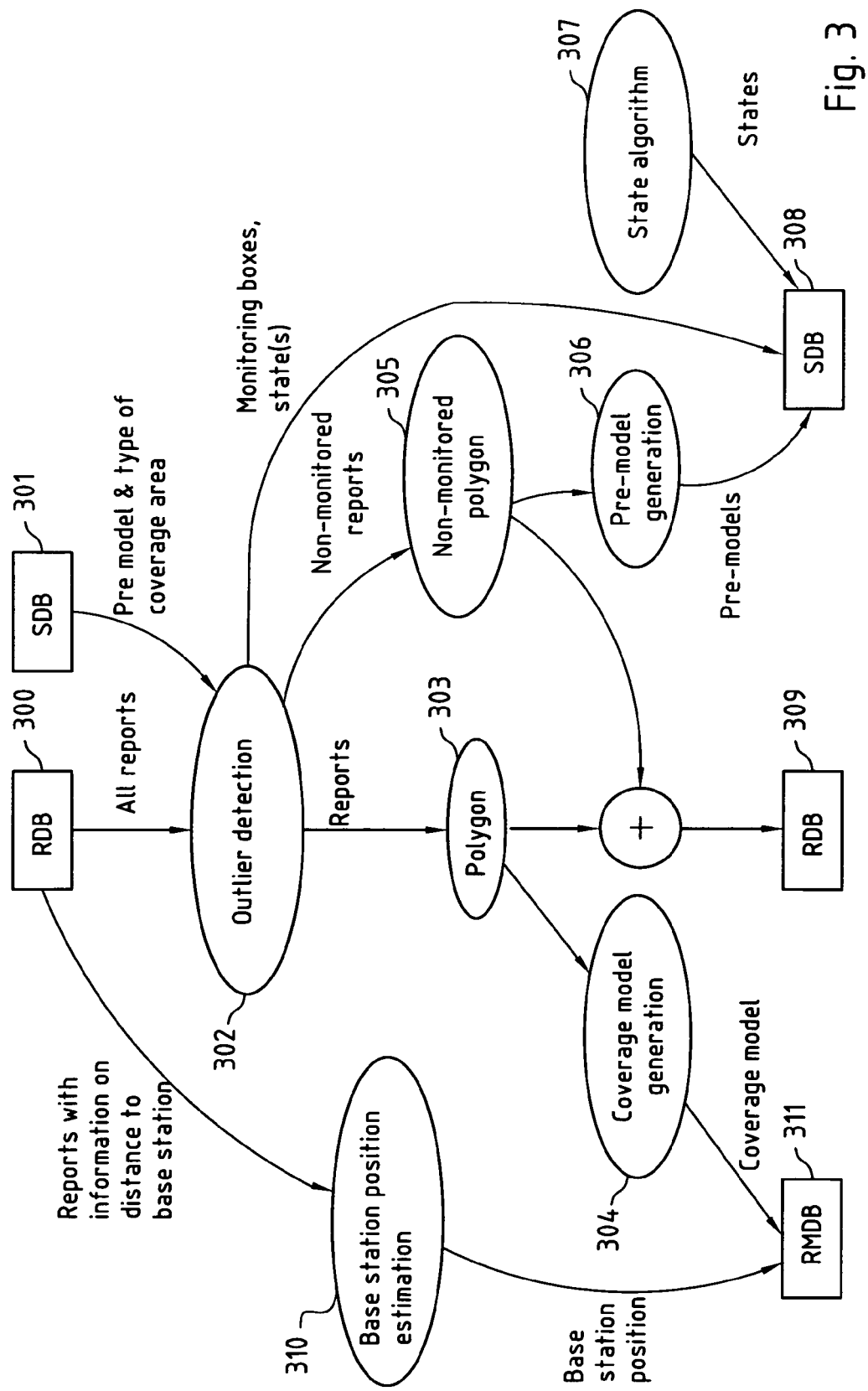
FIG. 3: a schematic block diagram of an exemplary embodiment of a process for generating and/or updating models for the coverage area of a base station according to the present invention.

FIG. 3 is a schematic illustration of an example of the generation of a polygon serving as a representation of the coverage area of a base station and the coverage model and pre-models derived from this polygon.

Therein, block 302 performs detection of potential outliers. This detection is based on pre-models and/or information on the type of coverage area to be determined, for instance the maximum possible radius of the coverage area, which may for instance be stored in SDB 301 (corresponding to SDB 12 of FIG. 1). The concept of detecting potential outliers will be explained in further detail below.

For all reports contained in RDB 300 (corresponding to RDB 13 of FIG. 1), a polygonal representation is determined in block 303. This polygon is then input into block 304, where a coverage model is generated from the polygon, and this coverage model is then stored in RMDB 311 (corresponding to RMDB 15 of FIG. 1).

For all currently non-monitored reports (i.e. for those reports that are neither suspected to be outliers nor suspected to be outdated, which will also be explained in more detail below), a non-monitored polygon is determined in block 305, and this non-monitored polygon (which usually covers a smaller area as compared to the polygon generated in box 303) serves as a basis for pre-model generation in block 306. This way, in case of potential outliers and/or potentially outdated positions, the optimal polygons both including and excluding the potential outliers and/or the potentially outdated positions can be maintained. This arrangement may ensure that if some of the monitored vertices are removed (as will be explained below), there are positions in reserve (i.e. positions in the vicinity of the monitored vertices that are not discarded in the filtering of FPFR block 11 since the pre-models used in this filtering are based on the non-monitored polygon) to produce a good coverage model.

The pre-models output by block 306 are then stored in SDB 308 (corresponding to SDB 12 in FIG. 1). SDB 308 further stores monitoring boxes (as will be explained in more detail below) set by block 302. Finally, SDB 308 further may store states of a state machine determined by a state algorithm 307.

The reports of the polygon determined in block 303 and of the non-monitored polygon determined in block 305 are stored back to RDB 309 (corresponding to RDB 13 in FIG. 1).

Reports in RDB 300 that additionally comprise information on a distance between the terminal position and the base station (for instance Timing Advance (TA) values available for instance in 2G systems) are processed by a base station estimation process 310 that estimates the position of the base station based on the terminal position and the distance to the base station as exemplarily explained in Appendix A.2. The base station position is then stored in RMDB 311 for distribution to the positioning clients 16 and optionally to the data collectors 10).

Each of blocks 303, 304, 305 and 306 in FIG. 3, or some or all of these blocks taken together, may be considered to represent a generating/updating process that generates and/or updates at least one model for the coverage area of a base station. The functionality of all blocks 303, 304, 305 and 306 taken together is referred to as RMG process in this specification.

In order to ensure that the coverage model and the pre-models are robustly adapted when the related coverage area changes (including moving, shrinking and disappearing of the coverage area), it may be advantageous to have a process that identifies and monitors potentially outdated reports and/or potential outliers and removes them if it is found that the reports are indeed outdated and/or outliers.

In the exemplary system of FIG. 1, a monitoring process (MON) keeps running (e.g. continuously, periodically or event-based) through the reports stored in RDB 13 and puts reports with too old timestamps (which timestamps are for instance assigned to the report upon reception), which are then considered as potentially outdated, into monitoring mode. This is accomplished by creating monitoring boxes for the reports, with an expiry time some time in the future. The associated coverage area is then also put into the RMG queue. Any new report with a position hitting a monitor box will cause the monitor box to be removed and the corresponding report's timestamp to be updated to the current time. The timestamp of a report therefore indicates when was the last time that there was a report from (the vicinity) of the report's position.

Furthermore, if any monitor box is detected to be past its expiry time, it is removed together with its associated report, and the associated coverage area is put into the RMG queue. The monitoring process further triggers state transitions of the state diagram, as will be explained with reference to FIG. 4 below.

In the exemplary system of FIG. 1, in addition to the MON process, which puts reports that are suspected to be outdated into monitoring mode, also an outlier detection process is implemented (as part of the RMG process), which may put reports that are suspected to be outliers into monitoring mode. Outlier detection is performed by checking new reports against the old coverage area estimates and by putting potential outliers directly into monitoring with a specific expiry time. Therein, once a report is in monitoring mode, the treatment is the same irrespective of which process (MON or RMG/outlier detection) actually put the report into monitoring mode.

In the exemplary system of FIG. 1, single potential outliers are put in monitoring so that they disappear quickly (if their monitoring boxes get no hits, so that they are considered to be indeed outliers) unless they are verified by new reports (if their monitoring boxes get one or more hits, so that they are considered to be no outliers, for instance when the coverage area has moved). In case of multiple (for instance more than a pre-defined threshold) potential outliers from different terminals (or, if it cannot be distinguished between terminals, having different timestamps i.e. coming from different upload batches (for instance if the reports are assigned the timestamps only in the server)), all the vertices of the polygon are put in monitoring and the coverage area is set to MOVING state, so that either the old positions or the new positions are quickly verified and the obsolete ones expire away.

Figure 4:
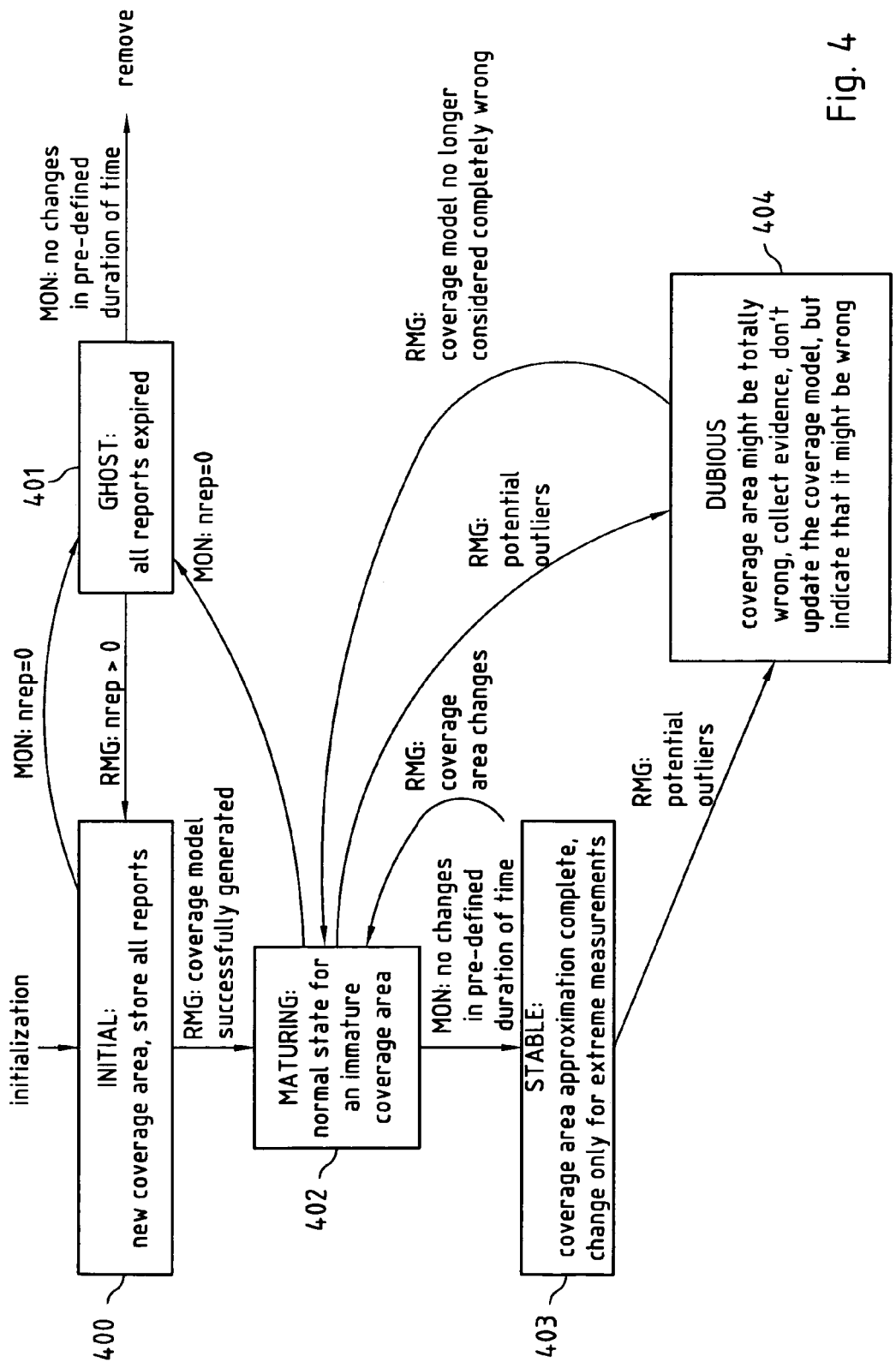
FIG. 4: a schematic illustration of the states and state transitions of an exemplary state machine according to the present invention.

For the exemplary system of FIG. 1, FIG. 4 illustrates an exemplary state transition diagram for the states of a state machine associated with a coverage area and the events from the MON and RMG processes that partially trigger the state transitions. Exemplarily an elliptical coverage model is assumed. The states of the state machine may for instance influence the amount of filtering in FPFR block 11, but also may influence whether a coverage model shall be updated and written to RMDB 15 or not and if a coverage area shall be removed from the system, to name but a few examples.

Initialization leads to the INITIAL state 400, i.e. there is a new coverage area to be determined, and all incoming reports may be stored (for instance, no filtering may then be performed in FPFR block 11). If monitoring reveals that there are no reports for the coverage area anymore, the state is changed to GHOST 401, i.e. there are no reports or all reports expired. If monitoring turns out that no changes occur in a pre-defined duration of time, the coverage area is removed.

If the state is INITIAL 400, and RMG reports that an elliptical coverage model has been successfully generated, the new state is MATURING. If monitoring now turns out that there are no changes within a pre-defined duration of time (and the coverage area is not in the RMG queue), the state is changed to STABLE 403, and is only changed back to MATURING 402 in case that the RMG process informs on changes in the coverage area. Furthermore, if in state STABLE 403, the RMG process informs that there are multiple potential outliers, the state is changed to DUBIOUS 404. The same information causes also a transition from state MATURING 402 to state DUBIOUS 404.

In state DUBIOUS 404, the elliptical coverage model is not updated (see step 303 in FIG. 3), but it is indicated that it might be wrong (for instance via the state of the state machine in RMDB 15, see Table 1). From the DUBIOUS state 404, a transition to state MATURING 402 is possible if the RMG process reports that the coverage model is no longer considered to be completely wrong (for instance since it passed one or more sanity checks, for instance that the size of the assumed coverage area is again within predefined limits).

As already mentioned above, these states may be used in FPFR block 11 of the exemplary system of FIG. 1 to perform pre-filtering of terminal positions, based on pre-models.

Figure 5:
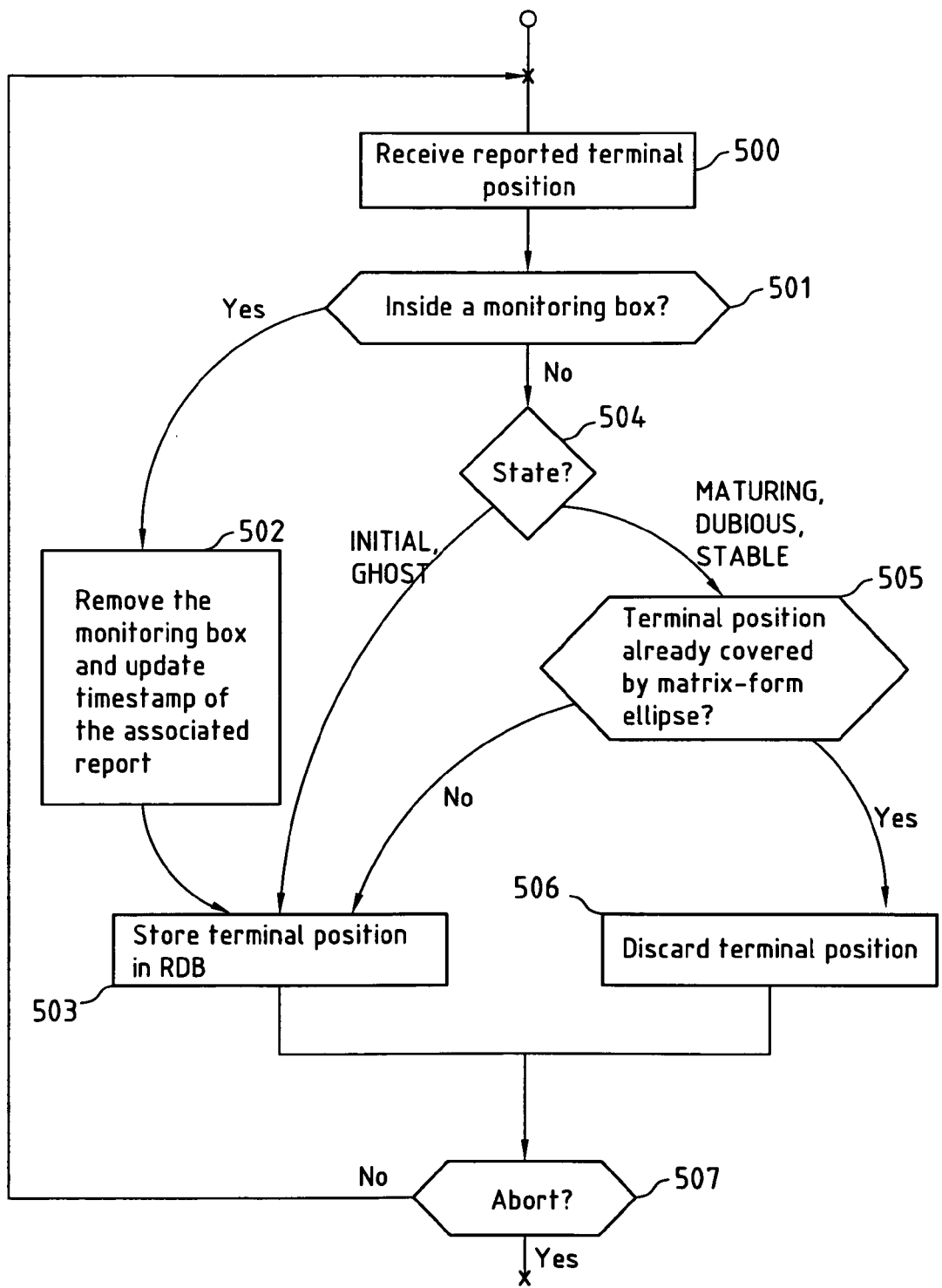
FIG. 5: a flowchart of an exemplary embodiment of filtering of terminal positions.

FIG. 5 is an exemplary flowchart of such a pre-filtering operation, wherein exemplarily an elliptical pre-model in matrix-form is used. After a reported terminal position is received (e.g. in a fingerprint from one of the data collectors 10, see FIG. 1), it is checked in step 501 if this terminal position is within a monitoring box. If this is the case, in a step 502, the monitoring box is removed and the timestamp of the report that is associated with the reported terminal position is updated. The terminal position is then stored in RDB 13 (see FIG. 1) in a step 503. If the terminal position is not in a monitoring box (see step 501), the state of the state machine is checked in step 504. If the state is INITIAL or GHOST, the terminal position is stored to RDB 13 in step 503 without any checking. Otherwise (states are MATURING, DUBIOUS or STABLE), it is checked if the terminal position is already covered by the matrix-form elliptical pre-model. If this is not the case, the terminal position is stored in RDB 13 (step 503), and otherwise, the terminal position is discarded in step 506. Both steps 503 and 506 lead to step 507, where it is checked if the process shall be aborted, and if this is not the case, the flowchart jumps back to step 500.

Figure 6:
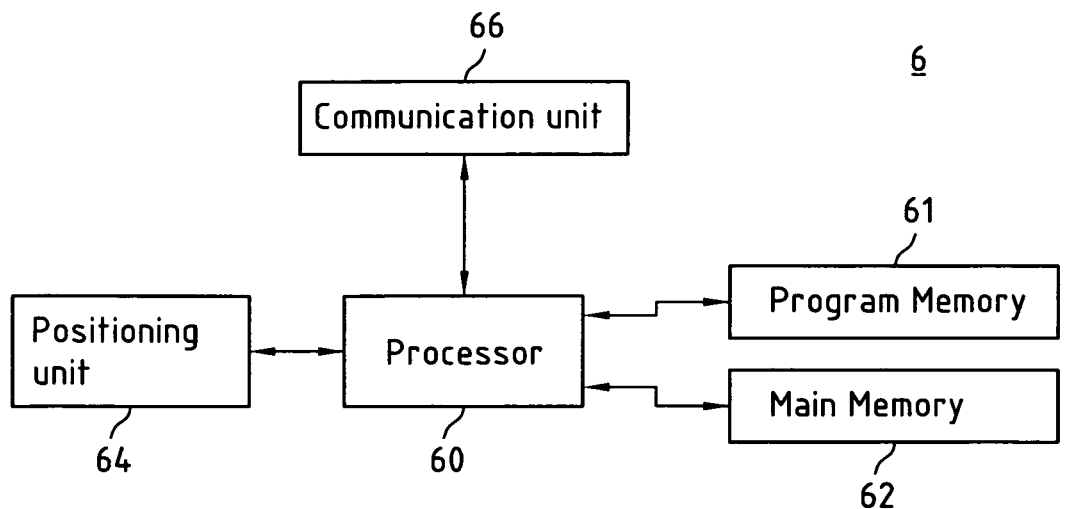
FIG. 6: a schematic block diagram of an exemplary embodiment of an apparatus according to the present invention.

FIG. 6 shows an exemplary embodiment of an apparatus 6 according to the present invention, which apparatus may for instance be a terminal 10 (see FIG. 1) or a part thereof. Apparatus 6 comprises a processor 60 that interfaces with a program memory 61, a main memory 62, a communication unit 63 and a positioning unit 64.

Positioning unit 64 is configured to allow apparatus 6 to perform positioning (i.e. determining its position), for instance based on a satellite-based positioning system, such as GNSS, and/or other positioning techniques (including for instance fingerprint-based positioning techniques, but this may not be preferred or only applied with due care since it may induce circular reasoning into the exemplary system of FIG. 1). Positioning unit 64 may also receive the position information via a user interface of apparatus 6, for instance if a user of a device that includes apparatus 6 enters the position information, e.g. based on a map and/or on characteristic landmarks. The positioning may for instance be controlled by processor 60 and may for instance be performed periodically or upon specific events (such as for instance a request from a user of a device that comprises apparatus 6 and/or from a request received from an external unit, such as for instance a unit of a fingerprint collection system).

Communication unit 63 is configured to allow processor 60 to communicate with one or more devices. Communication unit 63 is for instance configured to enable apparatus 6 to exchange data with base stations of one or more communications systems or to at least receive data from base stations of one or more communications systems. For instance, apparatus 6 may use communication unit 63 to perform a sniffing operation to determine which base stations (of the same or different communication systems, including serving and neighboring base stations) can presently be heard and to provide the identifiers of these base stations (e.g. MAC IDs) and optionally further parameters related to these base stations to processor 60.

Communication unit 63 may also allow apparatus 6 to exchange information with a fingerprint collection system such as the exemplary fingerprint collection system of FIG. 1.

For instance, one or more coverage models, one or more pre-models, a state of a state machine, and/or quality measures for base station position estimates may be received from such a fingerprint collection system via communication unit 63, for instance from RMDB 15 (see FIG. 1 and Table 1).

Furthermore, fingerprints comprising a terminal position, (usually) identifiers of one or more (serving or neighboring) base stations, and optionally further parameters information on distance(s) to the one or more base stations (e.g. TA and/or Round Trip Delay (RTD) values and/or Received Signal Strength (RSS) values) and/or one or more timestamps (which may for instance reflect a time instance at which the position is measured and/or the respective base station is heard) may be sent to a fingerprint collection system via communication unit 63. In a fingerprint, thus information pertaining to coverage areas of several base stations (of the same or different communications systems) can be reported.

Processor 60 controls communication unit 63 and positioning unit 64 and is at least configured to determine (for instance based on information received via communication unit 63 or stored in main memory 62) whether at least one terminal position (for instance obtained from positioning unit 64) associated with a coverage area of a base station shall be discarded or reported (for instance in a fingerprint via communication unit 63) to allow at least one of said coverage area and said base station to be characterized at least partially based on said at least one reported terminal position. Therein, the characterization of the coverage area of the base station may for instance be performed by the RMG process (see RMG block 14 of FIG. 1 and blocks 303-306 of FIG. 3) of the exemplary fingerprint collection system of FIG. 1, and the characterization of the base station may for instance be performed by the base station position estimation that is part of the RMG process (see block 310 in FIG. 3), at least partially based on the fingerprints sent 6 to FPFR block 11 (see FIG. 1).

Processor 60 may for instance run a computer program with program code for determining, at a terminal, whether at least one terminal position associated with a coverage area of a base station shall be discarded or reported to allow at least one of said coverage area and said base station to be characterized at least partially based on said at least one reported terminal position. This program code may for instance be stored in program memory 61, which may be fixedly attached in apparatus 6 or may be a removable memory. Main memory 62 is used by processor 60 as a working memory, for instance to store intermediate results and variables.

Apparatus 6 may for instance be entirely implemented as a module that may for instance be integrated into a data collector 10 (see FIG. 1). Apparatus 6 may for instance be entirely implemented as a circuit on a semiconductor chip. Apparatus 6 may for instance be entirely implemented on a Digital Signal Processor (DSP), Application Specific Integrated Circuit (ASIC) or Field Programmable Gate Array (FPGA), to name but a few examples.

Figure 7:
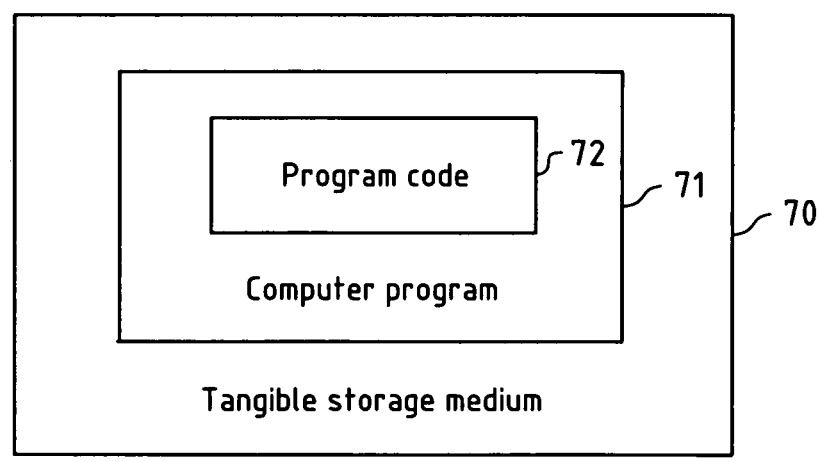
FIG. 7: a schematic illustration of an exemplary embodiment of a tangible storage medium according to the present invention.

FIG. 7 is schematic illustration of an exemplary embodiment of a tangible storage medium 70 according to the present invention. Tangible storage medium 70 may for instance store a computer program 71 with program code 72 for determining whether at least one terminal position associated with a coverage area of a base station shall be discarded or reported to allow at least one of said coverage area and said base station to be characterized at least partially based on said at least one reported terminal position. Tangible storage medium 70 is a readable medium, for instance a computer-readable or processor-readable medium. Accordingly, the computer program 71 stored on tangible storage medium 70 may be executable by a computer or a processor. Tangible storage medium 70 may for instance be embodied as an electric, magnetic, electro-magnetic, optic or other tangible storage medium, and may either be a removable medium or a medium that is fixedly installed in an apparatus or device, such as for instance apparatus 6 of FIG. 6.

FIGS. 8-13 are flowcharts of exemplary embodiments of methods according to the present invention. These flowcharts may for instance be implemented as computer programs that are stored in program memory 63 of apparatus 6 (see FIG. 6). Consequently, these flowcharts may be executed by processor 60 of apparatus 6. Equally well, these flowcharts may be implemented as program code 72 of computer program 71 stored on tangible storage medium 70 (see FIG. 7).

Figure 8:
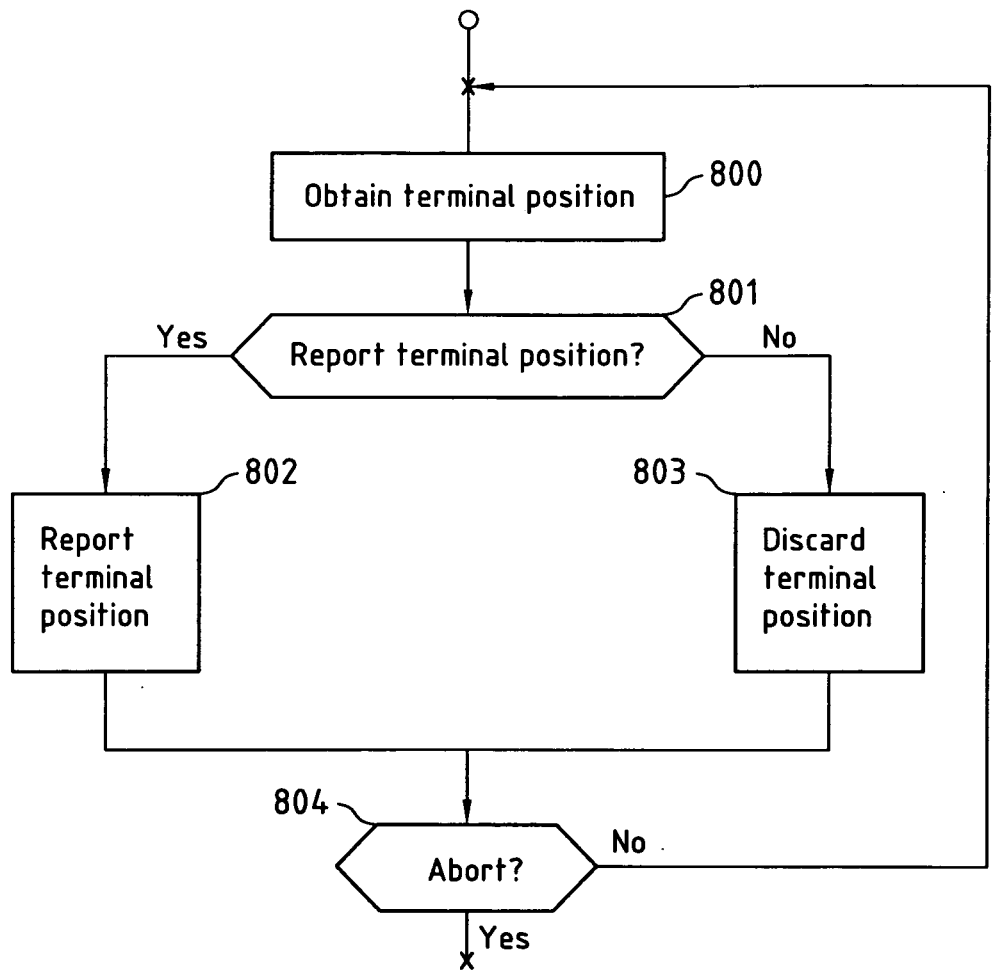
FIG. 8: a flowchart of an exemplary embodiment of a method according to the present invention.

In the flowchart of FIG. 8, in a first step 800, a terminal position is obtained, for instance via positioning unit 64 of apparatus 6 (see FIG. 6). This terminal position is associated with a coverage area of a base station, it is for instance within or at least assumed to be within this coverage area. In step 801, it is then determined if the terminal position shall be reported or discarded. This determining may be based on various types of information, such as a coverage model, a history of terminal positions, a state of a state machine and/or a quality of a base station position estimate, to name but a few non-limiting examples. If the determining is positive, the terminal position is considered to be potentially significant for the characterization of the coverage area, and is reported in a step 802 via communication unit 63 of apparatus 6 (see FIG. 6), for instance in a fingerprint.

Into this fingerprint, usually also an identifier of the base station is included, for instance if this information cannot be determined/reconstructed by a unit that receives the fingerprint. Alternatively, for instance, if the fingerprint is sent by the terminal to its serving base station and the fingerprint is either analyzed by this communication system itself or forwarded to a fingerprint collection system, and if the terminal is configured to report its position only to its serving base station, the identification of this serving base station may be added to or associated with the fingerprint by the serving base station (or another network node of the communication system) so that this information is available for processing of the fingerprint.

If the determining in step 801 is negative, the terminal position (and also the further optional parameters) is considered insignificant for the characterization of the coverage area and is discarded in a step 803 (for instance by deleting the terminal position). The flowchart then proceeds to step 804, where it is checked if the process shall be aborted. If this is not the case, the flowchart jumps back to step 800. Otherwise, the process terminates.

In this way, the amount of terminal positions that have to be considered in the process of characterizing the coverage area (such as for instance the RMG process that generates/updates models for the coverage area of the base station in the exemplary fingerprint collection system of FIG. 1) as well as the transmission resources (such as bandwidth and power) can be reduced.

It should be noted that a terminal position can be associated with coverage areas of several base stations at the same time. In the flowchart of FIG. 8, for the sake of simplicity of presentation, it is exemplarily assumed that the terminal position is only associated with one coverage area/base station, so that the determining in step 801 and the reporting in step 802 or the discarding in step 803 is performed with respect to a single coverage area/base station.

If a terminal position is associated with several coverage areas/base stations, then step 801 may be understood to be executed for each of these coverage areas/base stations, and the reporting in step 802 may be understood to represent that for each coverage area/base station, for which the determining in step 801 is positive, the corresponding base station identifier is included into a fingerprint that further includes the terminal position (and optionally further parameters) and that is reported when step 801 has been performed for all coverage areas/base stations the terminal position is associated with.

An analogous extension from a single coverage area/base station per terminal position to several coverage areas/base stations per terminal position also applies to the flowcharts of FIGS. 9-13 described below.

Figure 9:
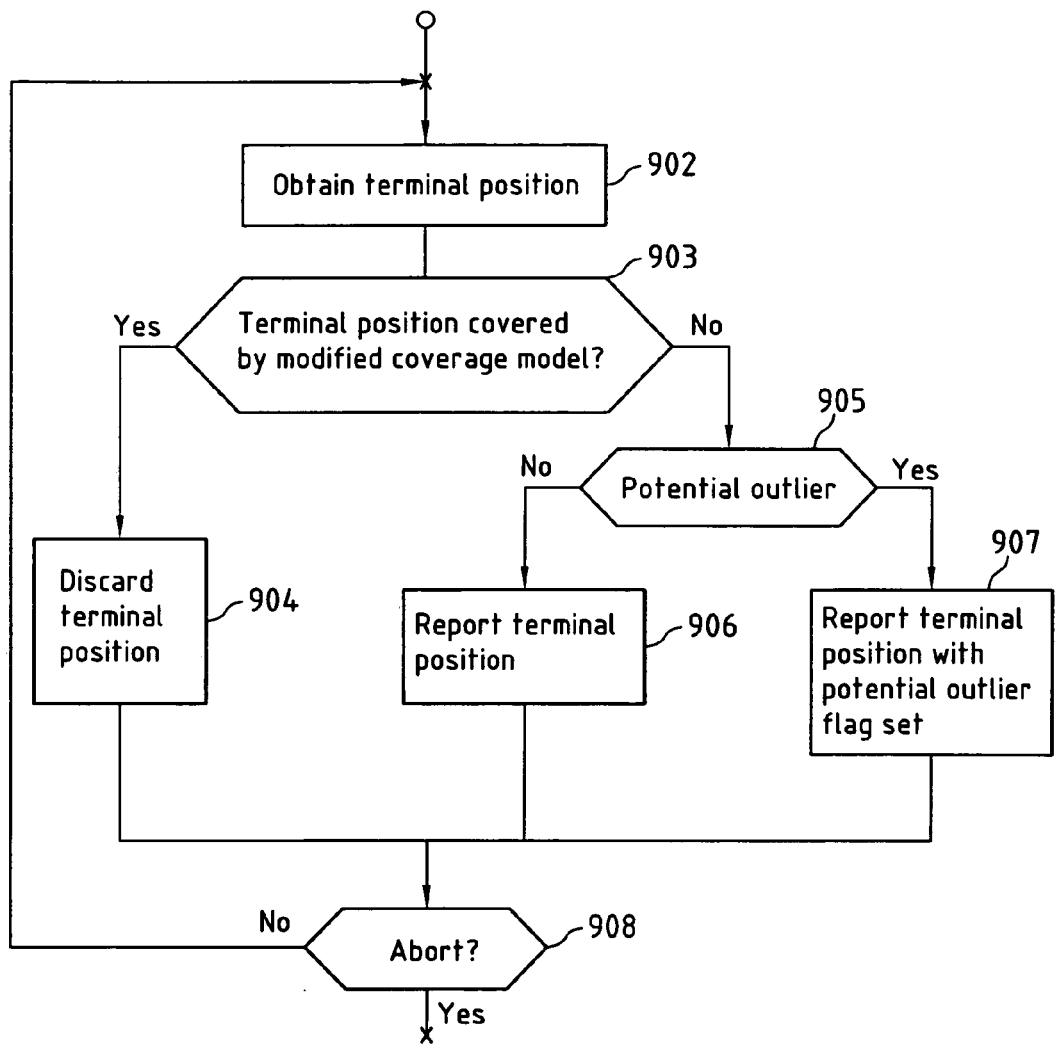
FIG. 9: a flowchart of a further exemplary embodiment of a method according to the present invention.

FIG. 9 illustrates a flowchart of a further exemplary embodiment of a method according to the present invention.

In a first step 902, a terminal position is obtained, as already explained with respect to step 800 in FIG. 8. In step 903, it is then determined if the terminal position is already covered by a modified coverage model. Therein, if the modified coverage model describes a hard boundary, the terminal position may for instance be considered to be covered by the modified coverage model if it is within the area defined by the modified coverage model.

If the checking in step 903 is positive, the terminal position is considered insignificant for the characterization of the coverage area (e.g. the generating/updating of models for the coverage area of the base station as for instance performed by the RMG process of the exemplary fingerprint collection system of FIG. 1), and is discarded in step 904. Otherwise, the terminal position may be reported in a fingerprint (for instance via communication unit 63 of the apparatus 6 of FIG. 6), for instance to FPFR block 11 of FIG. 1. In the exemplary flowchart of FIG. 9, before reporting the terminal position, it is furthermore (and optionally) checked in step 905 if the terminal position is a potential outlier. The terminal position may for instance be considered a potential outlier if its distance towards the coverage model (i.e. the assumed coverage area of the base station) exceeds a pre-defined threshold. If this is the case, the terminal position is reported with a potential-outlier-flag (e.g. a one-bit word) set, see step 907. Otherwise, the terminal position may be reported without such a flag being set in step 906.

Classifying the terminal position as a potential outlier may allow simplifying or even saving the outlier detection process implemented in the exemplary fingerprint collection system of FIG. 1 (see for instance block 302 in FIG. 3). Terminal positions classified as potential outliers by a terminal may then for instance directly be put into monitoring upon reception by FPFR block 11 of FIG. 1, which may contribute to speed up the detection of potential outliers. Depending on the frequency of updating of the (modified) coverage model in the terminal, it may however be the case that the outlier detection process implemented in the exemplary fingerprint collection system of FIG. 1 uses newer models and thus makes different decisions compared to the terminal.

After any of steps 904, 906 or 907, it is checked if the process shall be aborted, and only if this is not the case, the flowchart jumps back to step 902.

The modified coverage model used in step 903 of the flowchart of FIG. 9 may for instance be derived based on a coverage model that may for instance have been received from RMDB 15 of FIG. 1 (for instance via communication interface 63 of apparatus 6 of FIG. 6). This coverage model may for instance be an elliptical coverage model, for instance an axis/angle-form ellipse, or a model derived from such an axis/angle-form ellipse that may contain further parameters. This coverage model may then be modified to obtain the modified coverage model. The modified coverage model may for instance be obtained by scaling the coverage model. If the coverage model is an elliptical model, the scaling may for instance be performed by reducing (or increasing) the length of the major and/or minor semi-axis of the ellipse described by the elliptical model. For instance, both axes may be modified by multiplying it with the same factor (that is different from 1.0). In more general terms, the scaling may be performed by reducing (factor smaller than 1.0) (or increasing, factor greater than 1.0) the area of a geometrical object that is described by a coverage model. Therein, the modified coverage model may be stored in apparatus 6 of FIG. 6 or not.

Modifying the original coverage model by reducing the area of the geometrical object that is described by the coverage model, although slightly increasing the number of reported terminal positions that may actually be considered to be insignificant for the characterization of the coverage area, may nevertheless be necessary so that filtering of terminal positions does not interfere with monitoring of potentially outdated positions and/or potential outliers, as described with reference to the exemplary fingerprint collection system of FIG. 1 above (see the description of the MON process). For instance, if instead of the modified coverage model, the original (unmodified) coverage model was used, the filtering in step 903 might have the effect that only those parts of monitor boxes that are outside the coverage model would get hits. Such hits may however not occur at all if the coverage model already forms an accurate boundary of the coverage area (as for instance in the STABLE state). The factor by which the area described by the modified coverage area is smaller than the area of the original coverage area may for instance depend on the size of the monitor boxes used in monitoring.

If this size is variable, the factor may for instance be chosen based on the maximum possible size of a monitoring box.

It should be noted that, instead of modifying the coverage model, in apparatus 6 (e.g. a data collector 10 of FIG. 1), the modified coverage model may also be determined by a unit that is different from apparatus 6, for instance by RMG block 14 in the exemplary system of FIG. 1, and then be sent to apparatus 6. Furthermore, if the coverage model is an elliptical model, and if the determining step 903 has to be performed rather frequently with respect to the update rate of the coverage model, it may be advantageous to use a matrix-form ellipse in step 903, since the matrix-form allows to determine if a terminal position is covered by the model with less operations than an axis/angle-form model. If the coverage model provided is in axis/angle-form, this transformation to matrix-form may for instance be performed together with the modification. If already the modified elliptical model is provided to apparatus 6, it may be advantageous to perform the transformation to matrix-form only in apparatus 6, since the parameters of the axis/angle-form model may require less bandwidth for transmission than the parameters of the matrix-form model.

Furthermore, it should be noted that a modification of the coverage model used for filtering is not necessary in the flowchart of FIG. 5, which describes filtering in the FPFR block 11 of the exemplary system of FIG. 1, since there, monitoring boxes are checked in step 501 before any potential filtering is performed (see step 506).

Consequently, when integrating the checking if a terminal position is inside a monitoring box (see step 501 of FIG. 5) into the flowchart of FIG. 9, modification of the coverage model may no longer be necessary, and the unmodified coverage model that reflects the assumed coverage area could be used for checking in step 903 of the flowchart of FIG. 9. This may of course require that the monitoring boxes are transferred to apparatus 5 (that implements the flowchart of FIG. 9), and that apparatus 5 is further capable of signaling that a monitoring box shall be removed and the timestamp of the associated report shall be updated if a monitoring box got a hit.

Figure 10:
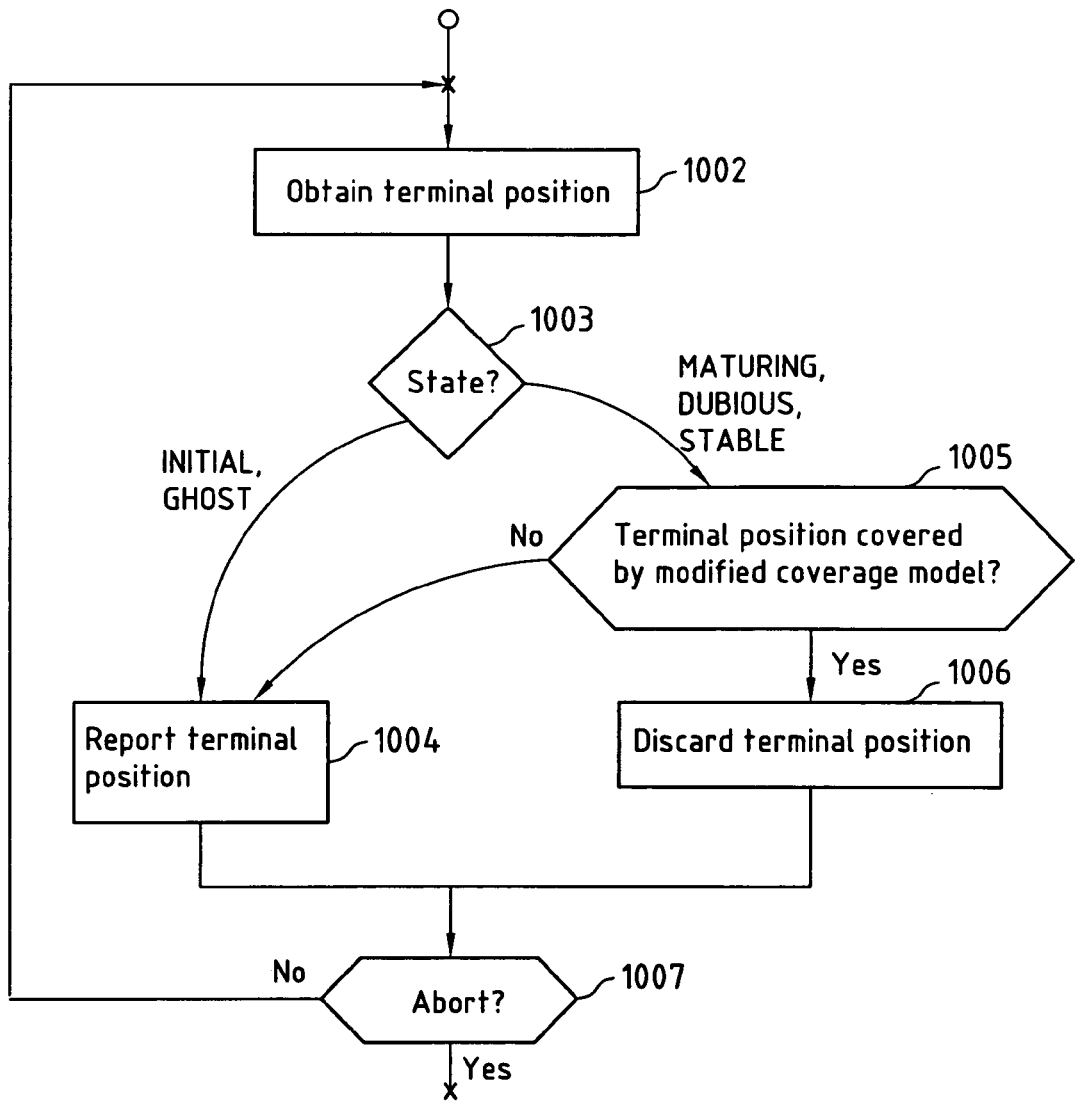
FIG. 10: a flowchart of a further exemplary embodiment of a method according to the present invention.

FIG. 10 illustrates a flowchart of a further exemplary embodiment of a method according to the present invention.

Therein, step 1002 corresponds to step 902 of the flowchart of FIG. 9, respectively. In the flowchart of FIG. 10, the determining whether a terminal position should be discarded or reported does not only dependent on a (modified) coverage model, but furthermore on a state of a state machine associated with the process of characterizing the coverage area (e.g. the state machine associated with the RMG process for a coverage area in the exemplary fingerprint collection system of FIG. 1, see FIG. 4). This state may for instance be received via communication unit 63 of the apparatus 6 of FIG. 6, for instance from RMDB 15 of FIG. 1.

In a state 1003, if the state is found to be INITIAL or GHOST, the terminal position is reported in a step 1004 (for instance with further parameters such as an identifier of the base station). This may reflect that any terminal position is considered to be significant for the current state of the RMG process.

If the state is STABLE, DUBIOUS or MATURING, it is checked in step 1004 if the terminal position is already covered by a modified coverage model (which may for instance be derived from a coverage model as already described in the context of FIG. 9 above). If this is not the case, the terminal position is again reported in step 1004; otherwise, the terminal position is discarded in step 1006.

After steps 1004 or 1006, it is checked in step 1007 if the process shall be aborted, and only if this is not the case, the flowchart jumps back to step 1002.

The terminal-side filtering according to the flowcharts of FIGS. 9 and 10 may for instance allow reducing the amount of information that has to be transferred to and considered in the RMG process of the system of FIG. 1. It may furthermore allow simplifying or even saving filtering of incoming fingerprints in the FPFR block 11 of the exemplary fingerprint collection system of FIG. 1, depending on how much of this filtering is outsourced to apparatus 6 (e.g. data collector 10 of FIG. 1).

Figure 11:
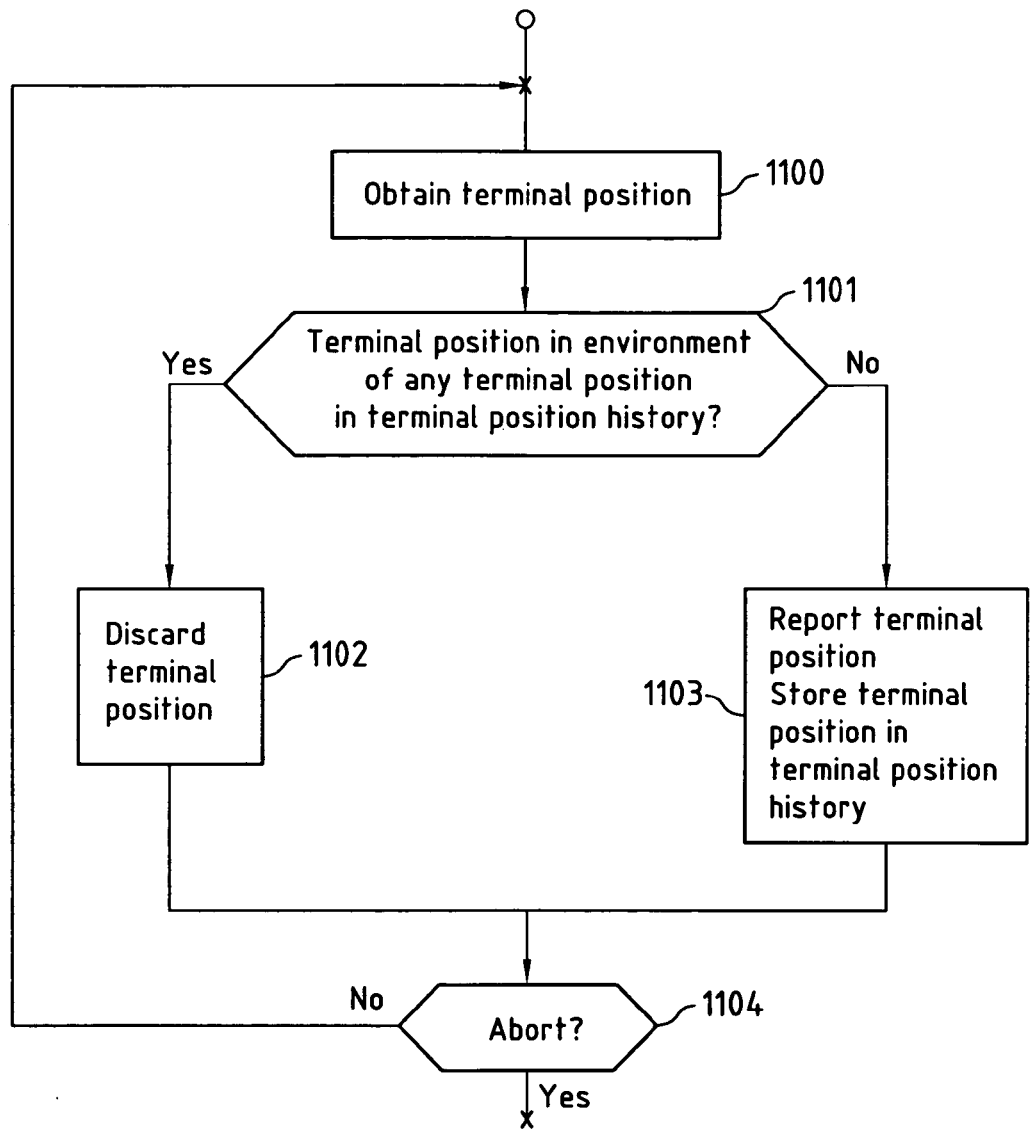
FIG. 11: a flowchart of a further exemplary embodiment of a method according to the present invention.

FIG. 11 illustrates a flowchart of a further exemplary embodiment of a method according to the present invention.

In a first step 1100, a terminal position associated with a coverage area is obtained, as already explained with reference to step 800 of FIG. 8 above. In a step 1101, it is then checked if the terminal position is in the environment of any terminal position contained in a terminal position history for this coverage area, which may for instance be maintained in main memory 62 of the apparatus 6 (see FIG. 6) and may store all terminal positions reported for this coverage area so far, or all terminal positions reported for this coverage area in a specific (e.g. pre-defined or dynamically adapted) time interval. The coverage area may for instance be identified by a specific identifier, such as for instance a base station identifier. The environment may for instance be a pre-defined environment, which may for instance be represented by an area of pre-defined shape and size around each terminal position in the terminal position history. The size of the area may equally well be adapted dynamically, for instance according to an information need of the process for characterizing the coverage area (e.g. the process of generating/updating models for the coverage area of the base station such as the RMG process of the exemplary fingerprint collection system of FIG. 1). The minimum size of the environment may for instance be determined by the resolution of the positioning of the terminal and/or the resolution of the process for characterizing the coverage area.

If the determining in step 1101 is positive, the terminal position is discarded in step 1102, and otherwise, in a step 1103, the terminal position is reported, for instance in a fingerprint (with further parameters such as for instance an identifier of the base station), and for instance to FPFR block 11 of the exemplary system of FIG. 1. In this step, furthermore the terminal position (and its associated further parameters, if present) is stored in the terminal position history for this coverage area so that it can be considered in the next determining in step 1101.

After steps 1102 or 1103, it is checked if the process shall be aborted, and only if this is not the case, the flowchart jumps back to step 1100.

Filtering the terminal positions in the terminal based on a (coverage-area-specific) terminal position history may account for the fact that users of data collectors 10 (see FIG. 1) may follow the same patterns from day to day—for instance, the same route every day to work, the same route every day to the supermarket. Therefore, it may be expected that a given user of a data collector collects the same data a high fraction of the time. Thus, storing the history of terminal positions already reported for a coverage area in a data collector 10 may allow for filtering out redundant terminal positions that then do not get reported to the server. Since the terminal position history is specific for a coverage area (which may for instance be identified by the base station identifier), also cases like assignment of new identifiers to base stations can be handled (a new base station identifier has no history so far, so that terminal positions will be reported for its associated coverage area).

Figure 12:
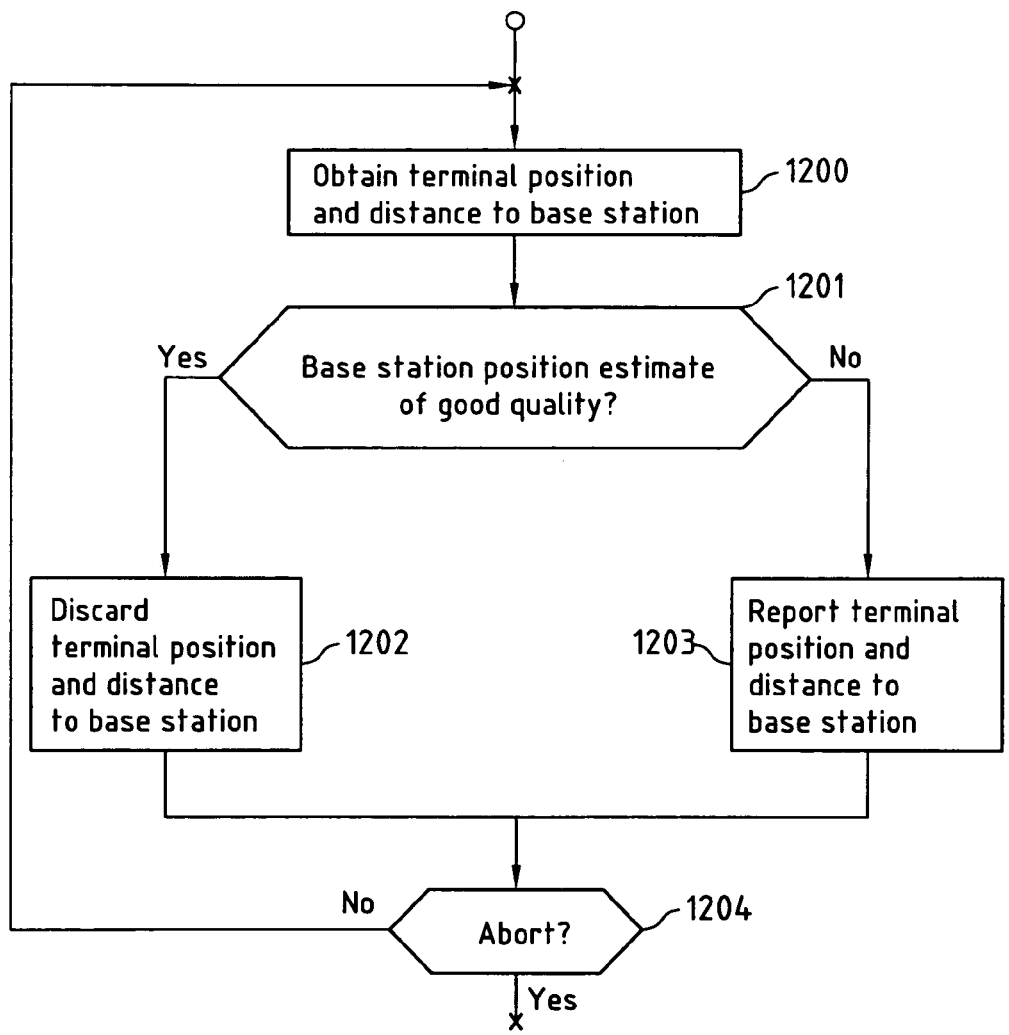
FIG. 12: a flowchart of a further exemplary embodiment of a method according to the present invention.

FIG. 12 is a flowchart of a further exemplary method according to the present invention.

In a first step 1200, a terminal position and a distance to the base station are obtained, for instance from positioning unit 64 of apparatus 6 (see FIG. 6). These values may for instance be periodically determined, or may be determined in response to a specific event, such as a request. Therein, the distance to the base station may for instance be represented by a TA, RTD or RSS value.

In step 1201, it is then determined if a base station position estimate is of good quality. Such a position of a base station may for instance be estimated as a characterization of the base station by the RMG process of the exemplary fingerprint collection system of FIG. 1 (see step 310 of FIG. 3 and appendix A.2), based on a plurality of terminal positions and respective distances to the base station. This estimation of the base station position may for instance also produce a quality value for the base station position estimate, such as for instance the covariance matrix. The determining in step 1201 may for instance be based on this covariance matrix, or on a bad-quality-flag (e.g. a 1-bit word) derived from it (for instance by setting the bad-quality flag if the variance is above a pre-defined absolute or relative threshold or, for instance, large residuals were detected in the base station position estimation or, for instance, the estimate did not pass some other statistical test including the $\chi^2$-test for the sum of the squared residuals). Consequently, the measure on which the determining in step 1201 is based has to be made available to apparatus 6, for instance via its communication unit 63. This measure may for instance be stored in RMDB 15 (see FIG. 1).

If the determining in step 1201 is positive, it is considered that there is no need to report further terminal positions to improve the base station estimate, and the terminal position and the distance to the base station are discarded in step 1202. Otherwise, it is considered that there is a need to report further terminal positions to allow the base station estimate to be improved, and the terminal position and the distance to the base station are reported in step 1203 (e.g. in a fingerprint, optionally with further parameters such as an identifier of the base station).

After steps 1202 or 1203, it is checked if the process shall be aborted in step 1204, and only if this is not the case, the flowchart jumps back to step 1200.

It is readily clear that the exemplary method described with reference to FIG. 12 can be used for a system that only estimates the positions of base stations, but does not necessarily have to determine models for the coverage area of the base station. Nevertheless, this method can seamlessly be integrated with a system that also determines models for the coverage area of a base station, as will now be explained with reference to FIG. 13.

Figure 13:
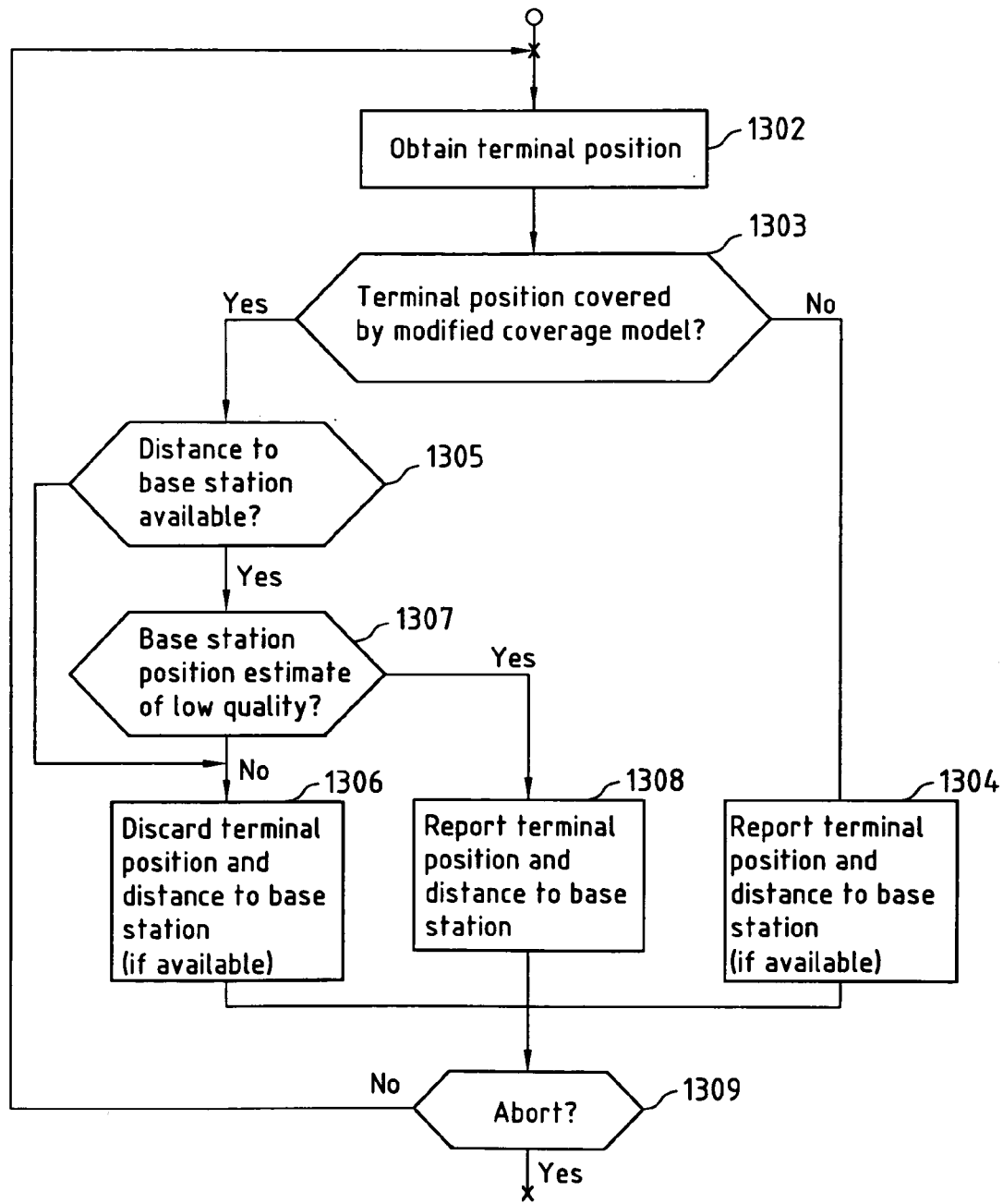
FIG. 13: a flowchart of a further exemplary embodiment of a method according to the present invention.

FIG. 13 is a flowchart of an exemplary method according to the present invention, and combines aspects of the flowcharts of FIGS. 9 and 12.

In a first step 1302, a new terminal position and, if available, a distance to the base station is obtained.

It is then determined in step 1303 if the terminal position is covered by a modified coverage model (which may for instance be derived from a coverage model as already described with reference to FIG. 9 above), as in step 903 of the flowchart of FIG. 9. If this is not the case, the terminal position and the distance to the base station are reported in a fingerprint. Otherwise, the information could actually be discarded. However, according to the flowchart of FIG. 13, it is checked if the information should nevertheless be reported to improve the base station position estimate.

To this end, in step 1305, it is checked if the distance to the base station is available. If this is the case, it is further checked in a step 1307 if the base station position estimate is of low quality, as discussed with reference to step 1201 of FIG. 12 above. If this is not the case (i.e. the base station position estimate is of good quality), the terminal position and the distance are discarded. Otherwise, it is considered that the terminal position and the distance should contribute to improve the base station position estimate, and both parameters are reported in a fingerprint.

After steps 1304, 1306 or 1308, it is checked if the process shall be aborted, and only if this is not the case, the flowchart jumps back to step 1302.

The concept of state-dependent filtering in the terminal, as exemplarily shown in the flowchart of FIG. 10, may equally well be introduced into the flowchart of FIG. 13, for instance by adding a checking of the state (as in step 1003 of FIG. 10) between steps 1302 and 1303 of FIG. 13, proceeding to step 1303 only in case of the state being, for example, MATURING, DUBIOUS or STABLE, and proceeding to step 1304 otherwise. The following appendix describes exemplary algorithmic details of the present invention and is to be understood as part of the disclosure.

APPENDIX A.1

Coordinate and Ellipse Conversions

Straight lines on Earth are defined as those following the great circles the circles on the surface of the earth dividing the Earth into two equal hemisphere so that the centre of the Earth lies on the plane defined by the great circles), and there is a difference between them and the straight lines in geodetic coordinates. These are luckily negligible for small coverage areas. At latitudes less than 80°, this error is less than 3 m for coverage areas with 5 km diameter, and less than 150 m for coverage area with 35 km diameter.

At latitude $\phi$, the length of one meter in East/North directions in degrees is:

$$s_E(\phi) = \frac{180}{\pi} \frac{\sqrt{1 - e^2 \sin(\phi)^2}}{a\cos(\phi)} \text{ degrees/meter}$$

$$s_N(\phi) = \frac{180}{\pi} \frac{(1 - e^2 \sin(\phi)^2)^{\frac{3}{2}}}{a(1 - e^2)} \text{ degrees/meter},$$

where a and e are the WGS-84 semi-major axis and eccentricity of Earth.

Then a local conversion from 2D geodetic coordinates ($\phi$, $\lambda$) to Cartesian East-North coordinates (x, y) with origin at ($\phi_0$, $\lambda_0$) is $$\begin{bmatrix} x \\ y \end{bmatrix} = M \begin{bmatrix} \phi - \phi_0 \\ \lambda - \lambda_0 \end{bmatrix}$$

where $$M = \begin{bmatrix} 0 & s_E^{-1}(\phi_0) \\ s_N^{-1}(\phi_0) & 0 \end{bmatrix}, \quad (1)$$

Conversion Between Axis/Angle-Form and Matrix-Form Ellipses

The centers of the axis/angle-form and the matrix-form ellipses are the same. Given an axis/angle-form ellipse with semi-axes with radii $r_1$ and $r_2$ (in meters), and clock-wise angle $\theta$ between first semiaxis and North, the corresponding matrix form is $$A = M^T \begin{bmatrix} \sin(\theta) & \cos(\theta) \\ \cos(\theta) & -\sin(\theta) \end{bmatrix} \begin{bmatrix} r_1^{-2} & 0 \\ 0 & r_2^{-2} \end{bmatrix} \begin{bmatrix} \sin(\theta) & \cos(\theta) \\ \cos(\theta) & -\sin(\theta) \end{bmatrix} M. \quad (2)$$

Conversely, given the matrix A, the corresponding semi-axis lengths and rotation angle of the axis/angle-form ellipse are $r_1 = \sqrt{\text{first eigenvalue of } MA^{-1}M^T}$
$r_2 = \sqrt{\text{second eigenvalue of } MA^{-1}M^T}$
$\theta = \text{a tan 2}(v_1, v_2)$ where v is the eigenvector of $MA^{-1}M^T$ corresponding to its first eigenvalue, and the a tan 2-function denotes the arc tangent taking the quadrants into account.

APPENDIX A.2

Base Station Position Estimation

Figure 14:
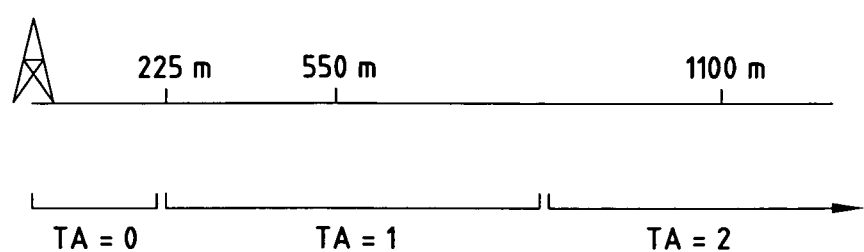
FIG. 14: a schematic illustration of a timing advance parameter.

The base station position may for instance be estimated in the RMG block 14 (see FIG. 1) from the terminal positions and associated distances to the base station, such as for instance TA measurements. The resolution of 550 m in TA range measurement may place severe penalty on the accuracy, which may be of the order of 50-100 m even in ideal cases. The relationship between distance and TA measurement is illustrated in FIG. 14.

Let the initial base station position estimate be $x_0$ and its covariance matrix $C_0$. These can be obtained form a previous calculation. Alternatively, the initial position $x_0$ may for example be an average of the terminal positions. The elements of $C_0$ can then be set to some suitable large value.

The base station position as well as the terminal positions are exemplarily assumed to be in geodetic WGS-84 coordinates, and they then have to be converted to Cartesian coordinates for distance computations. This is done by multiplying with matrix M (see equation (1) in appendix A.1 above) at proper places.

The resulting Gauss-Newton iteration for computing the base station position x and its covariance C from n measurements (with n, in this context, denoting the vertices of the polygon stored in RDB 13 of FIG. 1) is:

1. $x \leftarrow x_0$

2. $R = \begin{bmatrix} \sigma_1^2 & & & \\ & \ddots & & \\ & & \sigma_n^2 & \\ & & & C_0 \end{bmatrix}$, where $\sigma_i^2$ is the variance of the ith TA measurement $y_i$.

3. $d_i = M(p_i - x)$,
where $d_i$ is the unit vector from the base station position estimate x to the i-th terminal position $p_i$.

4. $f = \begin{bmatrix} y_1 - \|d_1\| \\ \vdots \\ y_n - \|d_n\| \\ x - x_0 \end{bmatrix}$.

(the innovation vector, with $y_i$ denoting the i-th TA measurement)

$$J = \begin{bmatrix} \dfrac{d_1^T}{\|d_1^T\|} M^T \\ \vdots \\ \dfrac{d_n^T}{\|d_n^T\|} M^T \\ I \end{bmatrix}$$

(the Jacobian matrix of partial derivatives)

5. $\Delta x \leftarrow -(J^T R^{-1} J)^{-1} J^T R^{-1} f$. Note that the matrix $(J^T R^{-1} J)$ might be numerically singular because of e.g. collinear geometry of the reports. In this case, return with a failure.

6. $x \leftarrow x + \Delta x$

7. Repeat from 3. until convergence (e.g. $\|\Delta x\|$ below a pre-determined threshold) or until a (pre-defined) maximum number of iterations has been reached.

8. Finally, check the magnitude of the residual $f^T R^{-1} f$ against some critical value $\alpha$ of the inverse of the cumulative $\chi^2$-distribution with n degrees of freedom. If the residual is small enough, set the covariance of the base station position to $C \leftarrow (J^T R^{-1} J)^{-1}$ and return x and C.

It is readily clear for a person skilled in the art that the logical blocks in the schematic block diagrams as well as the flowchart and algorithm steps presented in the above description and its appendices may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors (DSPs), application specific integrated circuits (ASICs), field programmable gate arrays (FPGAs) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

The invention has been described above by means of embodiments, which shall be understood to be exemplary and non-limiting. In particular, it should be noted that there are alternative ways and variations which are obvious to a skilled person in the art and can be implemented without deviating from the scope and spirit of the appended claims. It should also be understood that the sequence of all method steps presented above is not mandatory, also alternative sequences may be possible.

The invention claimed is:

1. An apparatus comprising:
a processor, and
a memory, said memory storing a program comprising program code, said memory and said program configured to, with said processor, cause said apparatus to perform determining, at a terminal, whether at least one terminal position of a plurality of positions of said terminal, said terminal position associated with a coverage area of a communication node, shall be discarded or reported to a unit that is different from said terminal to allow at least one of said coverage area and said communication node to be characterized at least partially based on said at least one reported terminal position.

2. The apparatus according to claim 1, wherein said determining whether said at least one terminal position shall be discarded or reported is at least partially based on at least one of a model for said coverage area of said communication node and a modified model for said coverage area of said communication node that is obtained by modifying said at least one model for said coverage area of said communication node.

3. The apparatus according to claim 2, wherein said model for said coverage area of said communication node is derived, as a characterization of said coverage area, from one or more terminal positions associated with said coverage area of said communication node and reported by one or more terminals.

4. The apparatus according to claim 2, wherein said at least one terminal position is determined to be discarded if it is covered by at least one of said model for said coverage area of said communication node and said modified model.

5. The apparatus according to claim 2, wherein said modified model for said coverage area of said communication node is a scaled representation of said at least one model for said coverage area of said communication node.

6. The apparatus according to claim 2, wherein said memory and said program are further configured to, with said processor, cause said apparatus to perform determining a mismatch between said at least one terminal position and one of said model for said coverage area of said communication node and said modified model and to report an indication of such a mismatch.

7. The apparatus according to claim 1, wherein said determining whether said at least one terminal position shall be discarded or reported is at least partially based on at least one of information on terminal positions that have been reported by said terminal before and a state of a process for characterizing said coverage area of said communication node at least partially based on one or more terminal positions reported by one or more terminals.

8. The apparatus according to claim 7, wherein said at least one terminal position is discarded if it is in a respective defined environment of any terminal position of a defined set of terminal positions that have been reported before.

9. The apparatus according to claim 1, wherein said memory and said program are further configured to, with said processor, cause said apparatus to perform determining whether said at least one terminal position and information on a distance between said at least one terminal position and said communication node shall be discarded or reported, and wherein said determining is at least partially based on information on a quality of an estimate of a position of said communication node.

10. The apparatus according to claim 9, wherein said position of said communication node is estimated, as a characterization of said communication node, based on one or more terminal positions and respective information on the distance between the terminal positions and the communication node reported by one or more terminals.

11. The apparatus according to claim 9, wherein said at least one terminal position and said information on said distance between said at least one terminal position and said communication node is determined to be reported if said quality of said estimate of said position of said communication node is considered low according to a defined criterion.

12. The apparatus according to claim 1, further comprising a transmitter configured to report said at least one terminal position in case it is determined that said at least one terminal position shall be reported.

13. The apparatus according to claim 1, wherein, in case it is determined that said at least one terminal position shall be reported, said at least one terminal position is reported as a fingerprint that further comprises an identifier of said communication node.

14. The apparatus according to claim 13, wherein said fingerprint further comprises an identifier of another communication node for which it is determined that said terminal position shall be reported to allow at least one of a coverage area of said other communication node and said other communication node to be characterized at least partially based on said at least one reported terminal position.

15. The apparatus according to claim 1, wherein said apparatus is at least one of a module, a portable electronic communication device and an apparatus comprising at least one of a user interface and an antenna.

16. A method comprising:
determining, at a terminal, whether at least one terminal position of a plurality of positions of said terminal, said terminal position associated with a coverage area of a communication node, shall be discarded or reported to a unit that is different from said terminal to allow at least one of said coverage area and said communication node to be characterized at least partially based on said at least one reported terminal position.

17. The method according to claim 16, wherein it is determined whether said at least one terminal position and information on a distance between said at least one terminal position and said communication node shall be discarded or reported, and wherein said determining is at least partially based on information on a quality of an estimate of a position of said communication node.

18. The method according to claim 16, wherein, in case it is determined that said at least one terminal position shall be reported, said at least one terminal position is reported as a fingerprint that further comprises an identifier of said communication node.

19. A non-transitory readable medium having a program comprising:
program code for performing the method according to claim 16, when said program is executed on a processor.

20. The method according to claim 16, wherein said determining whether said at least one terminal position shall be discarded or reported is at least partially based on at least one of a model for said coverage area of said communication node and a modified model for said coverage area of said communication node that is obtained by modifying said at least one model for said coverage area of said communication node.

21. The method according to claim 20, wherein said model for said coverage area of said communication node is derived, as a characterization of said coverage area, from one or more terminal positions associated with said coverage area of said communication node and reported by one or more terminals.

22. The method according to claim 20, wherein said at least one terminal position is determined to be discarded if it covered by at least one of said model for said coverage area of said communication node and said modified model.

23. The method according to claim 20, wherein said modified model for said coverage area of said communication node is a scaled representation of said at least one model for said coverage area of said communication node.

24. The method according to claim 20, further comprising determining a mismatch between said at least one terminal position and one of said model for said coverage area of said communication node and said modified model, and reporting an indication of such a mismatch.

25. The method according to claim 16, wherein said determining whether said at least one terminal position shall be discarded or reported is at least partially based on at least one of information on terminal positions that have been reported by said terminal before and a state of a process for characterizing said coverage area of said communication node at least partially based on one or more terminal positions reported by one or more terminals.

26. The method according to claim 25, wherein said at least one terminal position is discarded if it is in a respective defined environment of any terminal position of a defined set of terminal positions that have been reported before.

27. The method according to claim 17, wherein said position of said communication node is estimated, as a characterization of said communication node, based on one or more terminal positions and respective information on the distance between the terminal positions and the communication node reported by one or more terminals.

28. The method according to claim 17, wherein said at least one terminal position and said information on said distance between said at least one terminal position and said communication node is determined to be reported if said quality of said estimate of said position of said communication node is considered low according to a defined criterion.

29. The method according to claim 16, further comprising reporting said at least one terminal position in case it is determined that said at least one terminal position shall be reported.

30. The method according to claim 18, wherein said fingerprint further comprises an identifier of another communication node for which it is determined that said terminal position shall be reported to allow at least one of a coverage area of said other communication node and said other communication node to be characterized at least partially based on said at least one reported terminal position.

* * * * *